US012711680B2

(12) United States Patent
Shi et al.

(10) Patent No.: US 12,711,680 B2
(45) Date of Patent: Aug. 18, 2026

(54) DETECTING AND CORRECTING MISMATCHES BETWEEN IMAGES AND TEXT USING ASPECT-BASED VISION-LANGUAGE LEARNING

(71) Applicant: Adobe Inc., San Jose, CA (US)

(72) Inventors: Jing Shi, Rochester, NY (US); Hang Hua, Rochester, NY (US); Scott Cohen, Sunnyvale, CA (US); John Collomosse, Woking (GB); Kushal Kafle, Boston, MA (US); Simon Jenni, Hägendorf (CH)

(73) Assignee: Adobe Inc., San Jose, CA (US)

( * ) Notice: Subject to any disclaimer, the term of this patent is extended or adjusted under 35 U.S.C. 154(b) by 134 days.

(21) Appl. No.: 18/788,523

(22) Filed: Jul. 30, 2024

(65) Prior Publication Data

US 2026/0038167 A1 Feb. 5, 2026

(51) Int. Cl.
*G06T 11/60* (2026.01)
*G06F 40/58* (2020.01)

(52) U.S. Cl.
CPC .............. *G06T 11/60* (2013.01); *G06F 40/58* (2020.01)

(58) Field of Classification Search
None
See application file for complete search history.

(56) References Cited

U.S. PATENT DOCUMENTS

2025/0259338 A1* 8/2025 Babenko ................ G06T 11/00

OTHER PUBLICATIONS

Gordon, Brian, et al. "Mismatch quest: Visual and textual feedback for image-text misalignment." European Conference on Computer Vision. Cham: Springer Nature Switzerland, 2024. (Year: 2024).*

Agrawal, H., Desai, K., Wang, Y., Chen, X., Jain, R., Johnson, M., Batra, D., Parikh, D., Lee, S., Anderson, P., "nocaps: novel object captioning at scale", International Conference on Computer Vision (ICCV), pp. 8948-8957 (2019).

Alayrac, J.B., Donahue, J., Luc, P., Miech, A., Barr, I., Hasson, Y., Lenc, K., Mensch, A., Millican, K., Reynolds, M., et al., "Flamingo: a Visual Language Model for Few-Shot Learning", Advances in Neural Information Processing Systems (NeurIPS), 21, pp. 23716-23736 (2022).

(Continued)

*Primary Examiner* — Nurun Flora
(74) *Attorney, Agent, or Firm* — Keller Preece PLLC

(57) ABSTRACT

Methods, systems, and non-transitory computer readable storage media are disclosed for generating segmentations of a raster image via a half-edge mesh structure with scanline operations. The disclosed system determines, during scanline operations on a raster image, a plurality of sets of adjacent pixels having a common color value in the raster image. The disclosed system determines, during the scanline operations on the raster image, a plurality of half-edges at edges of pixels along a boundary of a set of adjacent pixels of the plurality of sets of adjacent pixels with next half-edge directions indicating directions of subsequent half-edges along the boundary of the set of adjacent pixels. The disclosed system generates one or more oriented polyline boundary loops representing the boundary of the set of adjacent pixels from the plurality of half-edges and the next half-edge directions of the set of adjacent pixels.

20 Claims, 12 Drawing Sheets

(56) References Cited

OTHER PUBLICATIONS

Awadalla, A., Gao, I., Gardner, J., Hessel, J., Hanafy, Y., Zhu, W., Marathe, K., Bitton, Y., Gadre, S., Sagawa, S., et al., "OpenFlamingo: An Open-Source Framework for Training Large Autoregressive Vision-Language Models", 20 pages, arXiv preprint arXiv:2308.01390v1, Aug. 2, 2023.
Byeon, M., Park, B., Kim, H., Lee, S., Baek, W., Kim, S., "Kakaobrain Coyo-700M: Image-Text Pair Dataset", 8 pages, https://github.com/kakaobrain/coyo-dataset (2022).
Chen, J., Zhu, D., Shen, X., Li, X., Liu, Z., Zhang, P., Krishnamoorthi, R., Chandra, V., Xiong, Y., Elhoseiny, M., "MiniGPT-v2: Large Language Model as a Unified Interface for Vision-Language Multi-Task Learning", 20 pages, arXiv preprint arXiv:2310.09478v3, Nov. 7, 2023.
Chen, L., Li, J., Dong, X., Zhang, P., He, C., Wang, J., Zhao, F., Lin, D., "ShareGPT4V: Improving Large Multi-Modal Models with Better Captions", 15 pages, arXiv preprint arXiv:2311.12793v2, Nov. 28, 2023.
Diwan, A., Berry, L., Choi, E., Harwath, D., Mahowald, K., "Why is Winoground Hard? Investigating Failures in Visuolinguistic Compositionality", 15 pages, arXiv preprint arXiv:2211.00768, Dec. 3, 2022.
Dong, X., Zhang, P., Zang, Y., Cao, Y., Wang, B., Ouyang, L., Wei, X., Zhang, S., Duan, H., Cao, M., Zhang, W et al., "InternLM-XComposer2: Mastering Free-Form Text-Image Composition and Comprehension in Vision-Language Large Model", 23 pages, arXiv preprint arXiv:2401.16420v1, Jan. 29, 2024.
Gao, P., Han, J., Zhang, R., Lin, Z., Geng, S., Zhou, A., Zhang, W., Lu, P., He, C., Yue, X., Li, H., Qiao, Y., "LLaMA-Adapter V2: Parameter-Efficient Visual Instruction Model", 15 pages, arXiv preprint arXiv:2304.15010 (2023).
GPT-4v(ision) system card (2023), 18 pages, https://api.semanticscholar.org/CorpusID:263218031.
Gurari, D., Zhao, Y., Zhang, M., Bhattacharya, N., "Captioning Images Taken by People Who Are Blind", In: Computer Vision-ECCV 2020: 16th European Conference, 18 pages, (2020) https://www.ecva.net/papers/eccv_2020/papers_ECCV/papers/123620409.pdf.
Hsieh, C.Y., Zhang, J., Ma, Z., Kembhavi, A., Krishna, R., "SugarCrepe: Fixing Hackable Benchmarks for Vision-Language Compositionality", 19 pages, arXiv preprint arXiv:2306.14610v1, Jun. 26, 2023.
Hu, Y., Hua, H., Yang, Z., Shi, W., Smith, N.A., Luo, J., "PromptCap: Prompt Guided Task-Aware Image Captioning", 16 pages, arXiv preprint arXiv:2211.09699, Nov. 15, 2022.
Hua, H., Li, X., Dou, D., Xu, C.Z., Luo, J., "Fine-tuning Pre-trained Language Models with Noise Stability Regularization", 15 pages, arXiv preprint arXiv:2206.05658v1, Jun. 12, 2022.
Hua, H., Li, X., Dou, D., Xu, C.Z., Luo, J., "Noise Stability Regularization for Improving BERT Fine-Tuning", 13 pages, arXiv preprint arXiv:2107.04835v1, Jul. 10, 2021.
Huang, K., Sun, K., Xie, E., Li, Z., Liu, X., "T21-CompBench: A Comprehensive Benchmark for Open-world Compositional Text-to-image Generation", 25 pages, arXiv preprint arXiv:2307.06350V2, Oct. 30, 2023.
Ilharco, G., Wortsman, M., Wightman, R., Gordon, C., Carlini, N., Taori, R., Dave, A., Shankar, V., Namkoong, H., Miller, J., Hajishirzi, H., Farhadi, A., Schmidt, L., "OpenCLIP", 5 pages, (Jul. 2021) https://doi.org/10.5281/zenodo.5143773.
Kaur, J.N., Bhatia, S., Aggarwal, M., Bansal, R., Krishnamurthy, B., "LM-CORE: Language Models with Contextually Relevant External Knowledge", 19 pages, arXiv preprint arXiv:2208.06458v1, Aug. 12, 2022.
Li, B., Zhang, Y., Chen, L., Wang, J., Yang, J., Liu, Z., "Otter: A Multi-Modal Model with In-Context Instruction Tuning", 11 pages, arXiv preprint arXiv:2305.03726v1, May 5, 2023.
Li, J., Li, D., Xiong, C., Hoi, S., "BLIP: Bootstrapping Language-Image Pre-training for Unified Vision-Language Understanding and Generation", In: International Conference on Machine Learning (PMLR) 13 pages, (2022) https://proceedings.mlr.press/v162/li22n/li22n.pdf.
Li, J., Li, D., Savarese, S., Hoi, S., "BLIP-2: Bootstrapping Language-Image Pre-training with Frozen Image Encoders and Large Language Models", 13 pages, arXiv preprint arXiv:2301.12597v3, Jun. 15, 2023.
Lin, J., Hua, H., Chen, M., Li, Y., Hsiao, J., Ho, C., Luo, J., Lin, J., Hua, H., Chen, M., Li, Y., Hsiao, J., Ho, C., Luo, J., "VideoXum: Cross-modal Visual and Textural Summarization of Videos", 15 pages, arXiv preprint arXiv:2303.12060v2, Apr. 6, 2023.
Liu, F., Lin, K., Li, L., Wang, J., Yacoob, Y., Wang, L., "Aligning Large Multi-Modal Model with Robust Instruction Tuning", 35 pages, arXiv preprint arXiv:2306.14565v1, Jun. 26, 2023.
Liu, H., Xue, W., Chen, Y., Chen, D., Zhao, X., Wang, K., Hou, L., Li, R., Peng, W., "A Survey on Hallucination in Large Vision-Language Models", 10 pages, arXiv preprint arXiv:2402.00253v2, May 6, 2024.
Liu, H., Li, C., Li, Y., Li, B., Zhang, Y., Shen, S., Lee, Y.J., "LLaVA-NeXT: Improved Reasoning, OCR, and World Knowledge", 6 pages, (Jan. 2024), https://llava-vl.github.io/blog/2024-01-30-llava-next/.
Liu, H., Li, C., Wu, Q., Lee, Y.J., "Visual Instruction Tuning", 25 pages, arXiv preprint arXiv:2304.08485v2, Dec. 11, 2023.
Liu, J., Wang,W., Wang, D., Smith, N.A., Choi, Y., Hajishirzi, H., "Vera: A General-Purpose Plausibility Estimation Model for Commonsense Statements", 24 pages, arXiv preprint arXiv:2305.03695v3, Oct. 18, 2023.
Lu, X.H., Kasner, Z., Reddy, S., "WebLINX: Real-World Website Navigation with Multi-Turn Dialogue", 50 pages, arXiv preprint arXiv:2402.05930v2, Sep. 10, 2024.
Lyu, H., Huang, J., Zhang, D., Yu, Y., Mou, X., Pan, J., Yang, Z., Wei, Z., Luo, J., "GPT-4V (ision) as A Social Media Analysis Engine", 56 pages, arXiv preprint arXiv:2311.07547v1, Nov. 13, 2023.
Ma, Z., Hong, J., Gul, M.O., Gandhi, M., Gao, I., Krishna, R., "Crepe: Can Vision-Language Foundation Models Reason Compositionally?", In: Proceedings of the IEEE/CVF Conference on Computer Vision and Pattern Recognition. pp. 10910-10921 (2023).
Morris, J.X., Lifland, E., Yoo, J.Y., Grigsby, J., Jin, D., Qi, Y., "TextAttack: A Framework for Adversarial Attacks, Data Augmentation, and Adversarial Training in NPL", 15 pages, arXiv preprint arXiv:2005.05909v4, Oct. 5, 2020.
Mu, N., Kirillov, A., Wagner, D., Xie, S., "SLIP: Self-supervision meets Language-Image Pre-Training", 13 pages, arXiv preprint arXiv:2112.12750v1, Dec. 23, 2021.
OpenAI, "Gpt-4 technical report". ArXiv preprint arXiv: 2303.08774v3, Mar. 27, 2023.
Parcalabescu, L., Cafagna, M., Muradjan, L., Frank, A., Calixto, I., Gatt, A., "VALSE: A Task-Independent Benchmark for Vision and Language Models Centered on Linguistic Phenomena", 28 pages, arXiv preprint arXiv:2112.07566v1, Dec. 14, 2021.
Parcalabescu, L., Gatt, A., Frank, A., Calixto, I., "Seeing past words: Testing the cross-modal capabilities of pretrained V&L models on counting tasks", 13 pages, arXiv preprint arXiv:2012.12352v1, Dec. 22, 2020.
Popovic, M., "chrF: character n-gram F-score for automatic MT evaluation", In: WMT@EMNLP (2015), pp. 392-395, https://api.semanticscholar.org/CorpusID:15349458.
Radford, A., Kim, J.W., Hallacy, C., Ramesh, A., Goh, G., Agarwal, S., Sastry, G., Askell, A., Mishkin, P., Clark, J., et al., "Learning transferable visual models from natural language supervision", In: International conference on machine learning (PMLR) pp. 8748-8763. (2021).
Rajpurkar, P., Zhang, J., Lopyrev, K., Liang, P., "SQuAD: 100,000+ Questions for Machine Comprehension of Text", 10 pages, arXiv preprint arXiv:1606.05250V3, Oct. 11, 2016.
Rawte, V., Sheth, A., Das, A., "A Survey of Hallucination in "Large" Foundation Models", 11 pages, arXiv preprint arXiv:2309.05922v1, Sep. 12, 2023.

(56) References Cited

OTHER PUBLICATIONS

Ray, A., Radenovic, F., Dubey, A., Plummer, B.A., Krishna, R., Saenko, K., "Cola: A Benchmark for Compositional Text-to-image Retrieval", 32 pages, (2023), https://api.semanticscholar.org/CorpusID:258546995.

Rombach, R., Blattmann, A., Lorenz, D., Esser, P., Ommer, B., "High-Resolution Image Synthesis with Latent Diffusion Models", In: Proceedings of the IEEE/CVF Conference on Computer Vision and Pattern Recognition (CVPR). pp. 10684-10695 (Jun. 2022).

Schuhmann, C., Beaumont, R., Vencu, R., Gordon, C., Wightman, R., Cherti, M., Coombes, T., Katta, A., Mullis, C., Wortsman, M., et al., "LAION-5B: An open large-scale dataset for training next generation image-text models", 50 pages, ArXiv preprint arXiv:2210.08402v1, Oct. 16, 2022.

Singh, A., Hu, R., Goswami, V., Couairon, G., Galuba, W., Rohrbach, M., Kiela, D., "FLAVA: A Foundational Language and Vision Alignment Model", In: Proceedings of the IEEE/CVF Conference on Computer Vision and Pattern Recognition, pp. 15638-15650 (2022).

Smithsonian Institution: "Smithsonian Open Access" (2023), 11 pages, https://www.si.edu/openaccess.

Sun, Q., Cui, Y., Zhang, X., Zhang, F., Yu, Q., Luo, Z., Wang, Y., Rao, Y., Liu, J., Huang, T., et al., "Generative Multimodal Models are In-Context Learners", 24 pages, arXiv preprint arXiv:2312.13286v1, Dec. 20, 2023.

Team, G., Anil, R., Borgeaud, S.,Wu, Y., Alayrac, J.B., Yu, J., Soricut, R., Schalkwyk, J., Dai, A.M., Hauth, A., et al., "Gemini: A Family of Highly Capable Multimodal Models", 62 pages, arXiv preprint arXiv:2312.11805v1, Dec. 19, 2023.

Thrush, T., Jiang, R., Bartolo, M., Singh, A., Williams, A., Kiela, D., Ross, C., "Winoground: Probing vision and language models for visio-linguistic compositionality", In: Proceedings of the IEEE/CVF Conference on Computer Vision and Pattern Recognition. pp. 5238-5248 (2022).

Touvron, H., Lavril, T., Izacard, G., Martinet, X., Lachaux, M.A., Lacroix, T., Rozière, B., Goyal, N., Hambro, E., Azhar, F., Rodriguez, A., Joulin, A., Grave, E., Lample, G., "LLaMA: Open and Efficient Foundation Language Models", 27 pages, ArXiv abs/2302.13971v1, Feb. 27, 2023.

Wang, B., Wu, F., Han, X., Peng, J., Zhong, H., Zhang, P., Dong, X., Li, W., Li, W., Wang, J., et al., "VIGC: Visual Instruction Generation and Correction", 15 pages, arXiv preprint arXiv:2308.12714V2, Sep. 11, 2023.

Wang, P., Yang, A., Men, R., Lin, J., Bai, S., Li, Z., Ma, J., Zhou, C., Zhou, J., Yang, H.: Ofa, "Unifying Architectures, Tasks, and Modalities Through a Simple Sequence-to- Sequence Learning Framework", In: International Conference on Machine Learning (PMLR) pp. 23318-23340, (2022).

Wang, T., Zhang, J., Fei, J., Ge, Y., Zheng, H., Tang, Y., Li, Z., Gao, M., Zhao, S., Shan, Y., et al., "Caption Anything: Interactive Image Description with Diverse Multimodal Controls", 11 pages, arXiv preprint arXiv:2305.02677v3, Jul. 6, 2023.

Wang, W., Bao, H., Dong, L., Bjorck, J., Peng, Z., Liu, Q., Aggarwal, K., Mohammed, O.K., Singhal, S., Som, S., et al., "Image as a Foreign Language: BEiT Pretraining for All Vision and Vision-Language Tasks", 18 pages, arXiv preprint arXiv:2208.10442v2, Aug. 31, 2022.

Yarom, M., Bitton, Y., Changpinyo, S., Aharoni, R., Herzig, J., Lang, O., Ofek, E., Szpektor, I., "What You See is What You Read? Improving Text-Image Alignment Evaluation", 17 pages, arXiv preprint arXiv:2305.10400v4, Dec. 26, 2023.

Ye, Q., Xu, H., Ye, J., Yan, M., Liu, H., Qian, Q., Zhang, J., Huang, F., Zhou, J., "mPLUG-Owl2: Revolutionizing Multi-modal Large Language Model with Modality Collaboration", 18 pages, arXiv preprint arXiv:2311.04257v2, Nov. 9, 2023.

Yin, S., Fu, C., Zhao, S., Xu, T., Wang, H., Sui, D., Shen, Y., Li, K., Sun, X., Chen, E., "Woodpecker: Hallucination Correction for Multimodal Large Language Models", 16 pages, arXiv preprint arXiv:2310.16045v1, Oct. 24, 2023.

Yu, J., Wang, Z., Vasudevan, V., Yeung, L., Seyedhosseini, M., Wu, Y., "CoCa: Contrastive Captioners are Image-Text Foundation Models", 19 pages, arXiv preprint arXiv:2205.01917v2, Jun. 14, 2022.

Yuksekgonul, M., Bianchi, F., Kalluri, P., Jurafsky, D., Zou, J., "When and Why Vision-Language Models Behave Like Bags-of-Words, and What to Do About it?", In: The Eleventh International Conference on Learning Representations (ICLR) 20 pages, (2022).

Zhang, D., Yang, J., Lyu, H., Jin, Z., Yao, Y., Chen, M., Luo, J., "CoCoT: Contrastive Chain-of-Thought Prompting for Large Multimodal Models with Multiple Image Inputs", 11 pages, arXiv preprint arXiv:2401.02582v1, Jan. 5, 2024.

Zhang, K., Mo, L., Chen, W., Sun, H., Su, Y., "MagicBrush: A Manually Annotated Dataset for Instruction-Guided Image Editing", Advances in Neural Information Processing Systems (NeurlIPS) 22 pages, (2024).

Zhang, T., Kishore, V., Wu, F., Weinberger, K.Q., Artzi, Y., "BERTScore: Evaluating Text Generation with BERT", 41 pages, arXiv preprint arXiv: 1904.09675v2, Oct. 1, 2019.

Zhao, H., Cai, Z., Si, S., Ma, X., An, K., Chen, L., Liu, Z., Wang, S., Han, W., Chang, B., "MMICL: Empowering Vision-Language Model with Multi-Modal in-Context Learning", 29 pages, arXiv preprint arXiv:2309.07915v2, Oct. 2, 2023.

Zhao, T., Zhang, T., Zhu, M., Shen, H., Lee, K., Lu, X., Yin, J., "VI-Checklist: Evaluating Pre-trained Vision-Language Models with Objects, Attributes and Relations", 12 pages, arXiv preprint arXiv:2207.00221v1, Jul. 1, 2022.

* cited by examiner

DETECTING AND CORRECTING MISMATCHES BETWEEN IMAGES AND TEXT USING ASPECT-BASED VISION-LANGUAGE LEARNING

BACKGROUND

Recent advancements in machine-learning capabilities of computing systems has increased the availability and utility of image processing operations. For example, many entities use generative neural networks for a variety of purposes, including generating image content for digital content generation in software development, image and video editing, and marketing use cases. Additionally, improved machine-learning capabilities have enabled and improved many types of digital content comprehension tasks, such as for understanding and generating accurate multimodal content including both digital images and text. Accurately and efficiently capturing compositional information in multimodal content, however, is often a challenging task due to the complexity of real world objects and scenes. Many existing systems that analyze or generate multimodal content often struggle to capture the compositional information in both the image and text contexts, resulting in inaccurate analysis and/or generated content.

SUMMARY

One or more embodiments provide benefits and/or solve one or more of the foregoing or other problems in the art with systems, methods, and non-transitory computer readable storage media for detecting and correcting mismatches in multimodal image and text content. In particular, the disclosed systems determine an image-text pair including a text string and a digital image corresponding to the text string. The disclosed systems utilize an image-text matching model trained on a synthesized dataset of mismatched image-text pairs to detect mismatches between the text string and the digital image via aspect-based compositions. In connection with detecting the mismatches, the disclosed systems also utilize the image-text matching model to generate corrections for the mismatches, such as by modifying elements of the digital image or the text string. Furthermore, in some embodiments, the disclosed systems generate the synthesized dataset of mismatched image-text pairs by modifying aspect graphs representing text content of the image-text pairs. The disclosed systems thus provide accurate and efficient aspect-based detection and correction of mismatches in multimodal image and text content.

BRIEF DESCRIPTION OF THE DRAWINGS

Various embodiments will be described and explained with additional specificity and detail through the use of the accompanying drawings.

DETAILED DESCRIPTION

Figure 1:
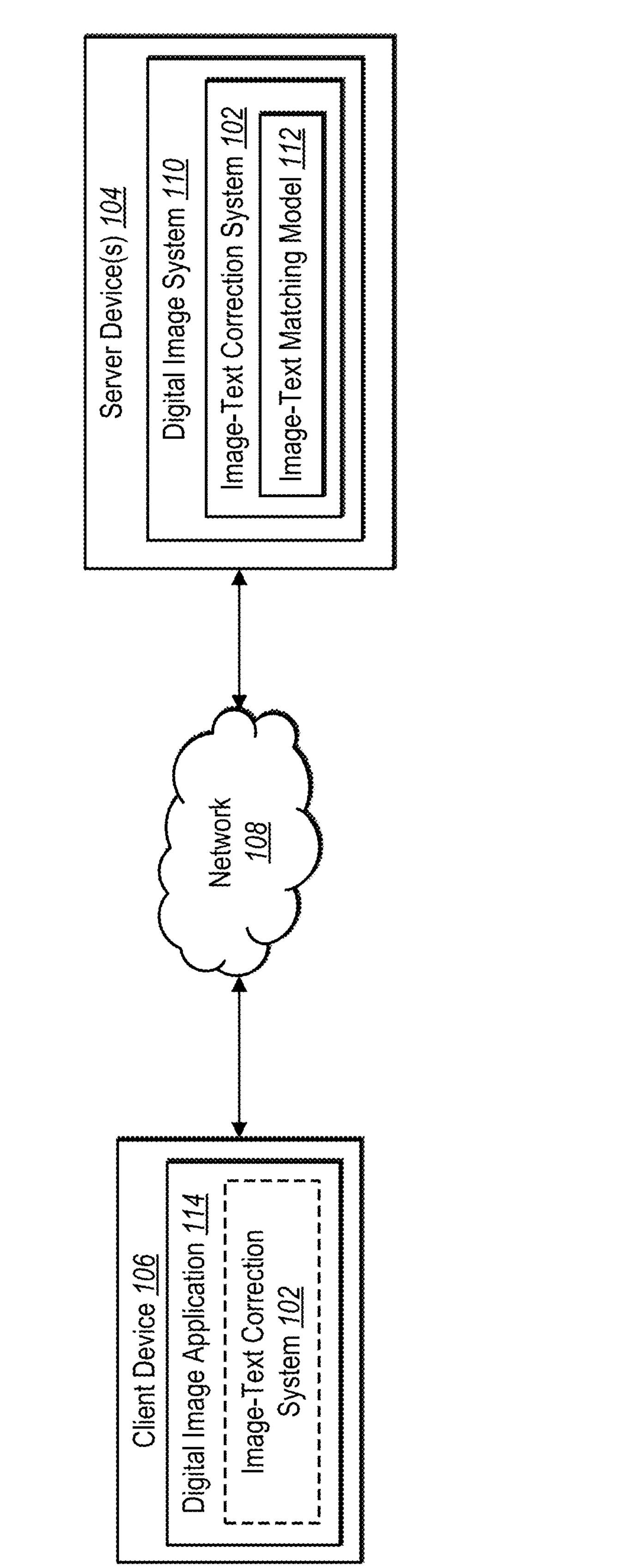
FIG. 1 illustrates an example system environment in which an image-text correction system operates in accordance with one or more implementations.

One or more embodiments of the present disclosure include an image-text correction system that detects and corrects mismatches in multimodal text and image content via aspect-based machine-learning. In particular, the image-text correction system determines an image-text pair including a text string and a digital image, such as in an image generation or image search task. The image-text correction system utilizes an image-text matching model to identify mismatched elements of the text string and the digital image and generate corrections for the mismatched elements. For example, the image-text correction system determines a corrected text string based on aspects of the mismatched elements for use in various multimodal tasks. To illustrate, the image-text correction system uses the corrections to modify or recreate the digital image (e.g., utilizing a generative neural network), clustering image search results, or for other downstream operations.

As mentioned, in one or more embodiments, the image-text correction system utilizes an image-text matching model to detect and correct mismatches in image-text pairs. For example, the image-text correction system determines an image-text pair in an image generation pipeline including a prompt (e.g., a text string) to a generative neural network. The image-text correction system utilizes an image-text matching model to determine mismatches between the text string and the corresponding digital image based on aspects of the text elements in the text string. More specifically, the image-text correction system utilizes the image-text matching model to determine text elements of the text string that do not match visual elements of the digital image according to their aspect (e.g., entities, relations, attributes, or numbers).

Furthermore, in some embodiments, in connection with detecting mismatches in image-text pairs, the image-text correction system also utilizes the image-text matching model to generate corrections for detected mismatches. In particular, the image-text correction system utilizes the image-text matching model to determine replacement elements according to the aspects of the text string. For instance, the image-text correction system generates replacement visual elements for generating a modified digital image or replacement text elements for generating a modified text string, depending on the particular implementation (e.g., a generative pipeline, an image search, or an image captioning pipeline).

Additionally, in some embodiments, the image-text correction system trains the image-text matching model on a synthesized dataset of mismatched image-text pairs. For example, the image-text correction system generates training image-text pairs by determining and modifying aspect graphs of text strings in a set of image-text pairs. Specifically, the image-text correction system generates the training image-text pairs by replacing one or more nodes in the aspect graphs of the text strings (e.g., by utilizing a large language model to replace the nodes with similar nodes of the same aspect classes). The image-text correction system utilizes the synthesized dataset to modify parameters of the image-text matching model, which trains the image-text matching model to detect such mismatches in image-text pairs during inference.

Conventional systems that perform multimodal content analysis or generation are often inefficient and/or inaccurate when dealing with complex language structures or images. For example, some conventional systems utilize vision-language models to comprehend or generate multimodal content (e.g., including images and text). Although such conventional systems are sometimes able to perform complex reasoning in various tasks, the systems often struggle to effectively and precisely capture compositional information of either or both images and text. Thus, the resulting analyses or generated content frequently have incorrect details in different aspects, such as incorrect numbers, object attributes, or relational composition. As an example, many generative neural networks provide realistic scenery in generated images, but often tie the incorrect attributes to certain objects in the generated images based on the provided prompts (e.g., the wrong color attached to the wrong object).

Furthermore, although some conventional systems are able to detect such errors in multimodal content, these conventional systems are limited in their capabilities. For example, some conventional systems that use vision-language models focus on constructing hard negative image-text pairs at the sentence level to evaluate the compositionality of the vision-language models. By focusing on the hard negative samples at the sentence level, the conventional systems ignore the capability of the models to localize mismatched phrases within each sentence, particularly for more complex sentence structures and fine-grained visual information. Thus, the conventional systems are unable to determine the appropriate corrections to fix any errors caused by this lack of functionality in the models.

The image-text correction system provides a number of advantages in computing systems that analyze and generate multimodal content. For example, the image-text correction system provides accurate multimodal mismatch detection via aspect-based machine-learning. In contrast to conventional systems that rely on models trained on hard negative samples, the image-text correction system uses a dataset of synthesized image-text pairs with mismatched elements according to aspects of the elements to train an image-text matching model. In particular, by using a model trained on the synthesized dataset of mismatched image-text pairs, the image-text correction system provides the ability to accurately localize mismatched elements in complex text and/or digital images.

Additionally, the image-text correction system provides improved functionality in multimodal content by providing corrections to detected mismatches in multimodal content. Specifically, by training the image-text matching model on a synthesized dataset of mismatched image-text pairs (e.g., by modifying aspect graphs of text strings), the image-text correction system improves the ability of the image-text matching model to determine replacement elements corresponding to detected mismatches. Thus, in contrast to some conventional systems that are able to determine that a digital image and text do not match, the image-text correction system provides detailed information about the mismatch as well as possible corrections for fixing the mismatch. Furthermore, by generating corrections for mismatched image-text pairs, the image-text correction system also improves pipelines involving the analysis or generation of multimodal content, such as by automatically correcting errors in an image generation pipeline using a generative neural network. The image-text correction system also provides improved image search functionality by clustering image results according to detected mismatches and/or by improving search queries via generated corrections for the mismatches.

Turning now to the figures, FIG. 1 includes an embodiment of a system environment 100 in which an image-text correction system 102 is implemented. In particular, the system environment 100 includes server device(s) 104 and a client device 106 in communication via a network 108. Moreover, as shown, the server device(s) 104 include a digital image system 110, which includes the image-text correction system 102. As illustrated, the image-text correction system 102 includes an image-text matching model 112. Furthermore, the client device 106 includes a digital image application 114, which optionally includes the image-text correction system 102 (or the digital image system 110).

As shown in FIG. 1, the client device 106 or the server device(s) 104 include or host the digital image system 110. The digital image system 110 includes, or is part of, one or more systems that implement digital content generation, editing, or analysis operations. For example, the digital image system 110 provides tools for generating, editing, or other processing operations involving multimodal content (e.g., digital images and text). To illustrate, the digital image system 110 communicates with the client device 106 via the network 108 to provide the tools for display and interaction via the digital image application 114 at the client device 106. Additionally, in some embodiments, the digital image system 110 receives requests to access digital content data stored (e.g., at the server device(s) 104 or at another device such as a database) and/or requests to store digital content data. In some embodiments, the digital image system 110 receives interaction data for viewing or performing various image/text processing operations and provides the results of the interaction data (e.g., generated digital image data) for display via the digital image application 114 or to a third-party system.

According to one or more embodiments, the digital image system 110 utilizes the image-text correction system 102 to detect and correct mismatches in image-text pairs. In particular, the image-text correction system 102 utilizes the image-text matching model 112 to detect mismatches between text elements in text strings and visual elements in digital images of the image-text pairs. Additionally, in some embodiments, the image-text correction system 102 utilizes the image-text matching model 112 to generate corrections for the mismatches in the image-text pairs. For example, the image-text correction system 102 determines mismatches and corrections for image-text pairs for various digital content pipelines, including generative neural network pipelines, image searches, or image captioning systems. Accordingly, the server device(s) 104 communicate with the client device 106 (e.g., via the digital image application 114 and/or another computing application at the client device 106) to send and receive data associated with performing operations in one or more pipelines utilizing the image-text matching model 112.

As illustrated in FIG. 1, the image-text correction system 102 is implemented on the client device 106 or on the server device(s) 104. In particular, in some implementations, the image-text correction system 102 on the server device(s) 104 supports the image-text correction system 102 on the client device 106. For instance, the server device(s) 104 generates or obtains the image-text correction system 102 (or the image-text matching model 112) for the client device 106 (e.g., as part of a software application or suite). The server device(s) 104 provides the image-text correction system 102 to the client device 106 for performing digital content analysis or generation processes at the client device 106. In other words, the client device 106 obtains (e.g., downloads) the image-text correction system 102 from the server device(s) 104. At this point, the client device 106 is able to utilize the image-text correction system 102 to analyze/generate digital content independently from the server device(s) 104.

In additional embodiments, although FIG. 1 illustrates the server device(s) 104 and the client device 106 communicating via the network 108, the various components of the system environment 100 communicate and/or interact via other methods (e.g., the server device(s) 104 and the client device 106 communicate directly). Furthermore, although FIG. 1 illustrates the image-text correction system 102 being implemented by a particular component and/or device within the system environment 100, the image-text correction system 102 is implemented, in whole or in part, by other computing devices and/or components in the system environment 100. For example, in some embodiments, the server device(s) 104 include or host the digital image system 110 and/or the image-text correction system 102.

To illustrate, the image-text correction system 102 includes a web hosting application that allows the client device 106 to interact with content and services hosted on the server device(s) 104 (e.g., in a software as a service implementation). To illustrate, in one or more implementations, the client device 106 accesses a web page supported by the server device(s) 104. The client device 106 provides input to the server device(s) 104 to view information for vectorization tasks and, in response, the image-text correction system 102 or the digital image system 110 on the server device(s) 104 performs operations to analyze/generate multimodal content. The server device(s) 104 provide the output or results of the operations to the client device 106.

In one or more embodiments, the server device(s) 104 include a variety of computing devices, including those described below with reference to FIG. 12. For example, the server device(s) 104 include one or more servers for storing and processing data associated with multimodal content processes. In some embodiments, the server device(s) 104 also include a plurality of computing devices in communication with each other, such as in a distributed storage environment. In some embodiments, the server device(s) 104 include a content server. The server device(s) 104 also optionally include an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 12). Furthermore, although not shown in FIG. 1, the client device 106 is operable by a user (e.g., a user included in, or associated with, the system environment 100) to perform a variety of functions. In particular, the client device 106 performs functions such as, but not limited to, accessing, viewing, generating, and editing multimodal content. In some embodiments, the client device 106 also performs functions for generating, capturing, or accessing data to provide to the digital image system 110 and the image-text correction system 102 in connection with analyzing/generating multimodal content. For example, the client device 106 communicates with the server device(s) 104 via the network 108 to provide information (e.g., user interactions) associated with digital content. Although FIG. 1 illustrates the system environment 100 with a single client device, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 optionally include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 12.

Figure 2:
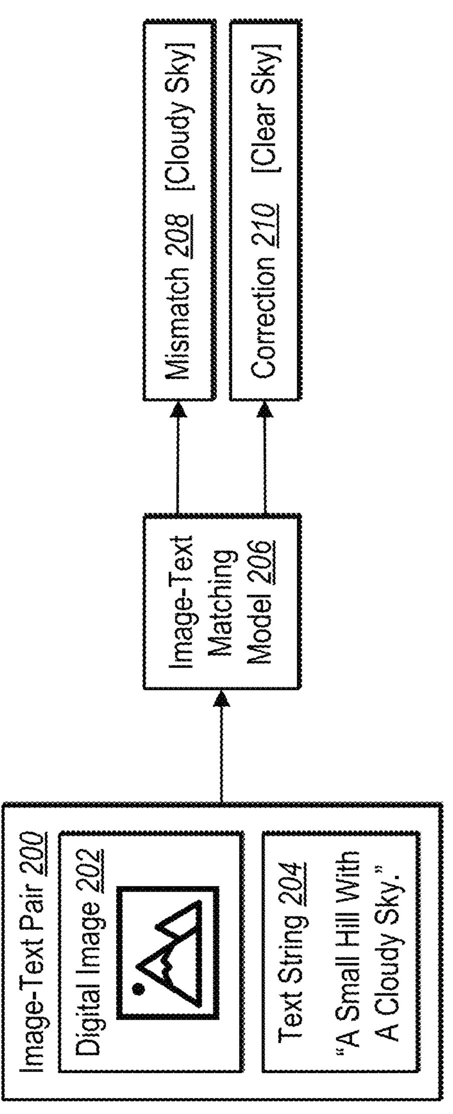
FIG. 2 illustrates a diagram of an overview of the image-text correction system detecting and correcting a mismatch in an image-text pair in accordance with one or more implementations.

As mentioned, the image-text correction system 102 analyzes or generates multimodal content utilizing an image-text matching model trained on mismatched image-text pairs. FIG. 2 illustrates an overview diagram of the image-text correction system 102 utilizing an image-text matching model to detect mismatches between image and text content in an image-text pair. Additionally, FIG. 2 illustrates that the image-text correction system 102 utilizes the image-text matching model to generate corrections for the mismatched elements in the image-text pair.

In one or more embodiments, the image-text correction system 102 determines an image-text pair 200 for one or more multimodal content operations. In particular, the image-text pair 200 includes a digital image 202 and a text string 204 that corresponds to the digital image 202. According to one or more embodiments, the text string 204 includes, but is not limited to, a sentence, a phrase, a combination of phrases, or text instructions. Additionally, in some examples, the digital image 202 includes, but is not limited to, a raster image, a vector image, or a photograph. Furthermore, the digital image 202 corresponds to the text string 204, such that the digital image 202 is generated based on the text string 204, or the text string 204 is generated based on the digital image 202.

To illustrate, in some embodiments, the text string 204 includes a prompt to a generative neural network to generate a digital image, and the digital image 202 includes the output of the generative neural network. In additional embodiments, the text string 204 includes a query to a search engine, and the digital image 202 includes a digital image returned as a search result. In further embodiments, the text string 204 includes a caption for the digital image 202, such as a caption generated by an image captioning system.

In one or more embodiments, as illustrated in FIG. 2, the image-text correction system 102 utilizes an image-text matching model 206 to process the image-text pair 200 and determine whether the image-text pair 200 includes a mismatch 208. In one or more embodiments, the image-text matching model 206 is a neural network that includes a computer representation that is tuned (e.g., trained) based on inputs to approximate unknown functions. For instance, a neural network includes one or more layers or artificial neurons that approximate unknown functions by analyzing known data at different levels of abstraction. In some embodiments, the image-text matching model 206 includes one or more neural network layers including, but not limited to, a convolutional neural network, a recurrent neural network, a transformer-based neural network, or a feedforward neural network. Furthermore, in one or more embodiments, the image-text matching model 206 includes, but is not is limited to, a vision-language model that leverages an image encoder and a text encoder to encode image and text information into the same encoding space. Thus, the image-text matching model 206 compares image content and text content in a unified embedding space to determine mismatches between the image content and the text content. In one or more embodiments, the image-text matching model 206 includes a vision-language model as described in U.S. patent application Ser. No. 18/443,808, "BUILDING VISION-LANGUAGE MODELS USING MASKED DISTILLATION FROM FOUNDATION MODELS" to Jenni, et al, filed Feb. 16, 2024, which is incorporated by reference herein in its entirety.

In one or more embodiments, the image-text correction system 102 utilizes the image-text matching model 206 to detect the mismatch 208 between the text string 204 and the digital image 202 based on various elements in the text string 204 and digital image 202. Additionally, as illustrated in FIG. 2, the image-text correction system 102 utilizes the image-text matching model 206 to generate a correction 210 for the mismatch 208 (e.g., changing "cloudy sky" from the text string 204 to "clear sky"). For example, the image-text correction system 102 generates the correction to fix the mismatch 208 between the text element and the visual element. As described in more detail below, the image-text correction system 102 utilizes the correction 210 to perform one or more downstream operations depending on the particular implementation (e.g., for a generative neural network pipeline, an image search, or an image captioning system).

Figure 3:
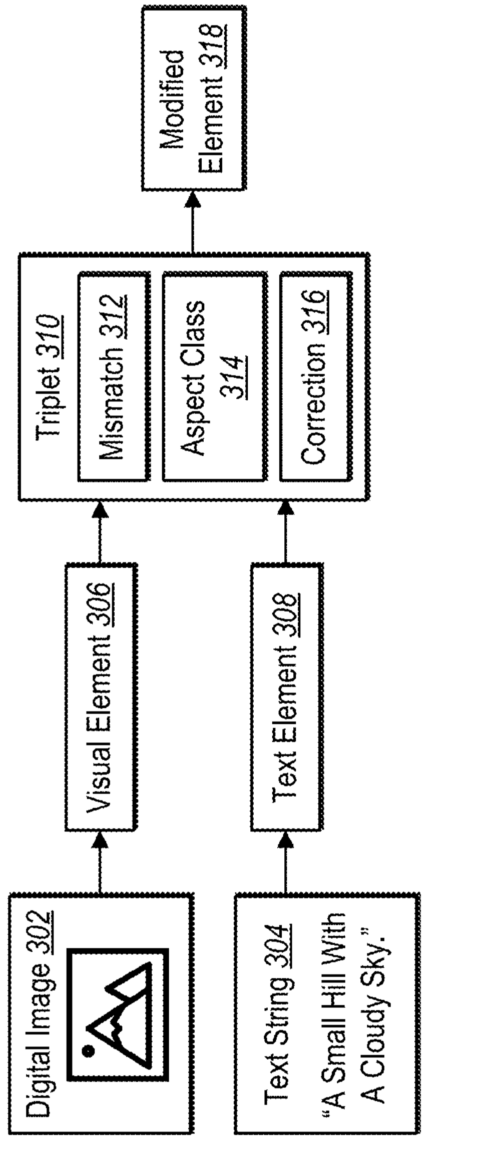
FIG. 3 illustrates a diagram of the image-text correction system modifying an element in an image-text pair utilizing a triplet corresponding to a detected mismatch in accordance with one or more implementations.

According to one or more embodiments, the image-text correction system 102 determines a mismatch in an image-text pair and generates a correction for the mismatch. FIG. 3 illustrates an example of the image-text correction system 102 correcting a mismatch based on a triplet for the image-text pair. In particular, the image-text correction system 102 generates the triplet including details about the mismatch and a corresponding correction for the mismatch for use in modifying a text element or a visual element.

In one or more embodiments, the image-text correction system 102 determines elements from a digital image 302 and a text string 304 in an image-text pair, as mentioned previously. The image-text correction system 102 utilizes an image-text matching model to determine one or more mismatched elements in the image-text pair. For example, the image-text correction system 102 utilizes the image-text matching model to determine a visual element 306 from the digital image that does not match a text element 308 from the text string 304. In one or more implementations, as mentioned, the image-text matching model utilizes image processing and text processing to determine (e.g., via a unified feature space) that the visual element 306 does not match the text element 308. To illustrate, the image-text correction system 102 determines that a particular phrase in the text string 304 does not match a particular portion of the digital image 302 that the image-text correction system 102 determined should match.

In one or more embodiments, a text element includes a word or a phrase corresponding to a specific part of speech in the text string 304, such as a verb, noun, adjective, adverb, preposition, or determiner. Additionally, in one or more embodiments, a visual element includes a visible part of the digital image 302 such as an object, a characteristic of an object (e.g., a color), a relational characteristic of two or more objects, etc. Thus, the image-text correction system 102 determines whether the text element 308 of the text string 304 matches up correctly with the visual element 306 of the digital image 302 based on one or more phrases in text elements of the text string 304 and characteristics of visual elements in the digital image 302.

In one or more embodiments, as mentioned, the image-text correction system 102 utilizes the image-text matching model to generate a triplet 310 including information based on a comparison of the visual element 306 and the text element 308. As an example, the image-text correction system 102 determines that an object or an attribute in the text string 304 does not match an object or attribute in the digital image 302 and generates the triplet 310 to include information describing the difference between the corresponding portions of the text element 308 and the visual element 306. In particular, the image-text correction system 102 generates the triplet 310 including a mismatch 312, an aspect class 314, and a correction 316. For instance, the image-text correction system 102 utilizes the image-text matching model to determine the mismatch 312 by detecting a semantic difference between the visual element 306 and the text element 308 (e.g., as indicated above) and generating an indication of the portion of the text string 304 that does not match the digital image 302 (e.g., by storing the text element 308 or a description/identifier of the text element 308 as the mismatch).

Furthermore, the image-text correction system 102 utilizes the image-text matching model to determine the aspect class 314 based on the mismatch 312. In one or more embodiments, the aspect class 314 represents a type of the mismatch 312 based on one or more predetermined classes. For example, the image-text correction system 102 generates the aspect class 314 by determining whether the mismatch 312 corresponds to an entity, a relation, an attribute, or a number. To illustrate, the image-text correction system 102 determines that the aspect class 314 is an entity in response to determining that the mismatch 312 is an object difference (e.g., a "car" versus a "bicycle"). Additionally, the image-text correction system 102 determines that the aspect class 314 is a relation in response to determining that the mismatch 312 is based on a difference in entity relationships (e.g., “standing beside” versus “walking on”). In some embodiments, the image-text correction system 102 determines that the aspect class 314 is an attribute in response to determining that the mismatch 312 is based on a description of an entity (e.g., “red” versus “green”). In some embodiments, the image-text correction system 102 determines that the aspect class 314 is a number in response to determining that the mismatch 312 is based on a number or count of an entity (e.g., “one” versus “large group”).

In one or more embodiments, the image-text correction system 102 also utilizes the image-text matching model to generate the correction 316 for the mismatch 312. In one or more embodiments, the image-text correction system 102 generates the correction 316 by determining a change to the text element 308 or the visual element 306 to result in a match between the text element 308 and the visual element 306. For instance, the image-text correction system 102 generates the correction 316 as a text representation of a correction of the semantic discrepancy between the text element 308 and the visual element 306 according to the aspect class 314 of the mismatch 312. To illustrate, in response to storing a description of the text element 308 as the mismatch 312 (e.g., indicating that the text element 308 should be changed to match the visual element 306), the image-text correction system 102 stores a text representation of the visual element 306 as the correction 316. Alternatively, in response to storing a description of the visual element 306 as the mismatch 312 (e.g., indicating that the visual element should be changed to match the text element 308), the image-text correction system 102 stores a text representation of the text element 308 as the correction 316. In one or more embodiments, the image-text correction system 102 generates the correction 316 to fix the mismatch 312 based on the aspect class 314 (e.g., such that the correction 316 also belongs to the aspect class 314).

Accordingly, in one or more embodiments, the image-text correction system 102 generates the triplet 310 to include text descriptions of the mismatch 312, the aspect class 314, and the correction 316. As an example, the image-text correction system 102 determines that the text string 304 reads “A large commercial plane flying in a cloudy gray sky.” Furthermore, the image-text correction system 102 utilizes the image-text matching model to determine that the digital image 302 includes “A small private plane flying in a clear sky.” Utilizing the image-text matching model to compare the digital image 302 and the text string 304, the image-text correction system 102 generates a plurality of triplets corresponding to a plurality of semantic discrepancies between the digital image 302 and the text string 304. To illustrate, the image-text correction system 102 generates the triplet 310 as vector or other data structure of [“entity,” “large commercial plane,” “small private plane”] in which “entity” is the aspect class 314, “large commercial plane” is the mismatch 312, and “small private plane” is the correction 316.

In response to generating one or more triplets (e.g., the triplet 310), in some embodiments, the image-text correction system 102 generates, or causes another device or system to generate, a modified element 318. In particular, the image-text correction system 102 utilizes the triplet 310 to determine which element to modify and how to modify the element. For example, the image-text correction system 102 determines whether to modify the visual element 306 or the text element 308 based on the particular implementation (e.g., whether to modify the text string 304 to match the digital image 302 or to modify the digital image 302 to match the text string 304). Additionally, in some embodiments, the image-text correction system 102 utilizes the mismatch 312 to find the corresponding element and changes the corresponding element according to the correction 316.

Figure 4:
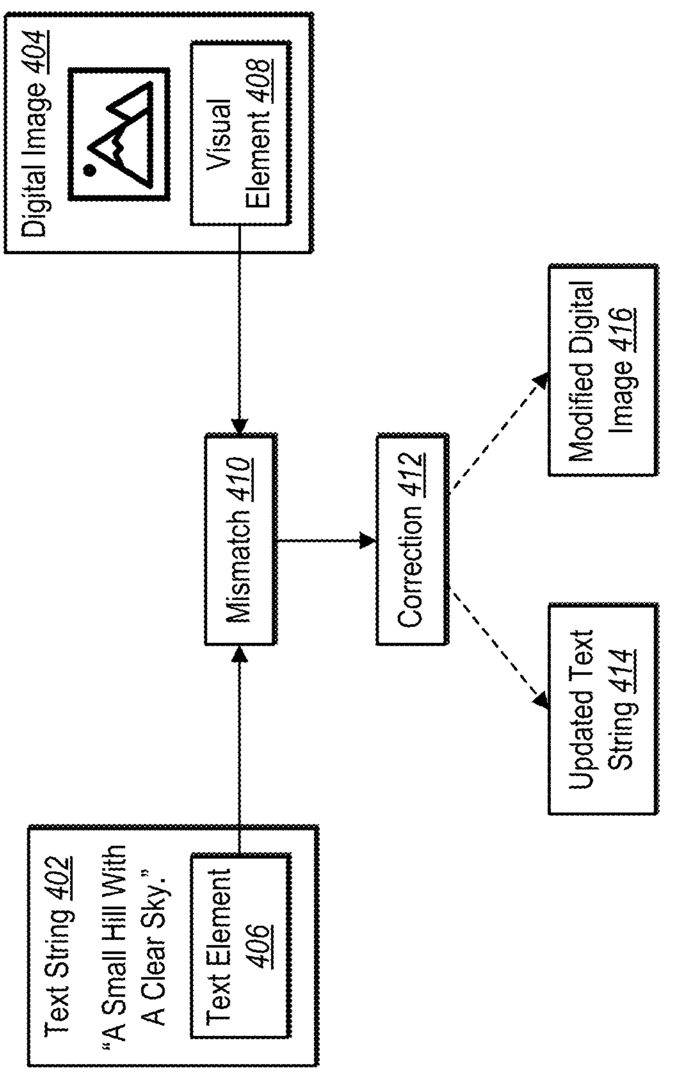
FIG. 4 illustrates a diagram of the image-text correction system implementing a correction for a mismatch in an image-text pair by modifying text or image content in accordance with one or more implementations.

In one or more embodiments, as mentioned, the image-text correction system 102 modifies either image content or corresponding text in an image-text pair based on detected semantic discrepancies. For example, FIG. 4 illustrates that the image-text correction system 102 utilizes information about a mismatch to modify either a text string or a digital image. Specifically, the image-text correction system 102 utilizes an image-text matching model to determine the mismatched content and provide a correction to use in modifying (or causing a device or system to modify) the corresponding text or image content.

In particular, as illustrated, the image-text correction system 102 determines a text string 402 and a digital image 404 in an image-text pair. For example, in some embodiments, the image-text pair includes digital image content and digital text content as part of an image generation pipeline using the text string 402 as a prompt to a generative neural network to generate the digital image 404. Alternatively, in some embodiments, the image-text pair includes digital image content and digital text content as part of an image captioning system using the digital image 404 as a source for generating the text string 402 as a caption. In further embodiments, the image-text pair includes the text string 402 as a search query to an image search in which the digital image 404 is a result of the search query.

Additionally, the text string 402 and the digital image 404 include various elements. For example, the text string 402 includes a text element 406 that corresponds to a visual element 408 of the digital image 404 (e.g., based on semantic context in the text string 402 and the digital image 404). In one or more embodiments, the image-text correction system 102 utilizes an image-text matching model to determine one or more semantic discrepancies between the elements of the text string 402 and the digital image 404. For example, the image-text correction system 102 determines a mismatch 410 between the text element 406 and the visual element 408.

Furthermore, as previously mentioned, the image-text correction system 102 utilizes the image-text matching model to generate a correction 412 for the mismatch 410. In one or more embodiments, the correction 412 includes a replacement element to replace the text element 406 or the visual element 408 (e.g., by replacing a text representation of the visual element). Additionally, depending on the particular implementation, the image-text correction system 102 determines an operation to perform utilizing the correction 412. For example, the image-text correction system 102 utilizes the correction 412 to perform an operation to modify the text string 402 or the digital image 404 to make the appropriate correction 412.

To illustrate, in one or more embodiments, the image-text correction system 102 modifies the text string to generate an updated text string 414 including the correction 412. More specifically, the image-text correction system 102 replaces the text element 406 with a replacement text element indicated by the correction 412 according to the aspect class of the mismatch 410. As an example, in response to determining that the digital image 404 includes a cloudy sky, and the text string 402 includes “clear sky,” the image-text correction system 102 generates the updated text string 414 to replace a text element of “clear sky” with a replacement text element of "cloudy sky" (e.g., to edit a particular attribute of the text string 402). For example, the image-text correction system 102 generates the updated text string 414 or a computing instruction that causes a computing device to generate the updated text string 414.

In one or more additional embodiments, the image-text correction system 102 modifies the digital image to generate a modified digital image 416 including the correction 412. In particular, the image-text correction system 102 generates a prompt for a generative neural network or other computing instruction to perform an image editing operation to generate the modified digital image 416. For instance, the image-text correction system 102 generates the modified digital image 416 to include an edited entity, attribute, relation, or number based on the correction 412. To illustrate, in response to determining that the visual element 408 should correspond to a "clear sky" of the text element 406, the image-text correction system 102 generates the modified digital image 416 to replace the visual element 408 (e.g., a cloudy sky as a background) with a corrected visual element (e.g., a clear sky as the background). Accordingly, the image-text correction system 102 adapts the correction 412 to the applicable implementation.

Figure 5:
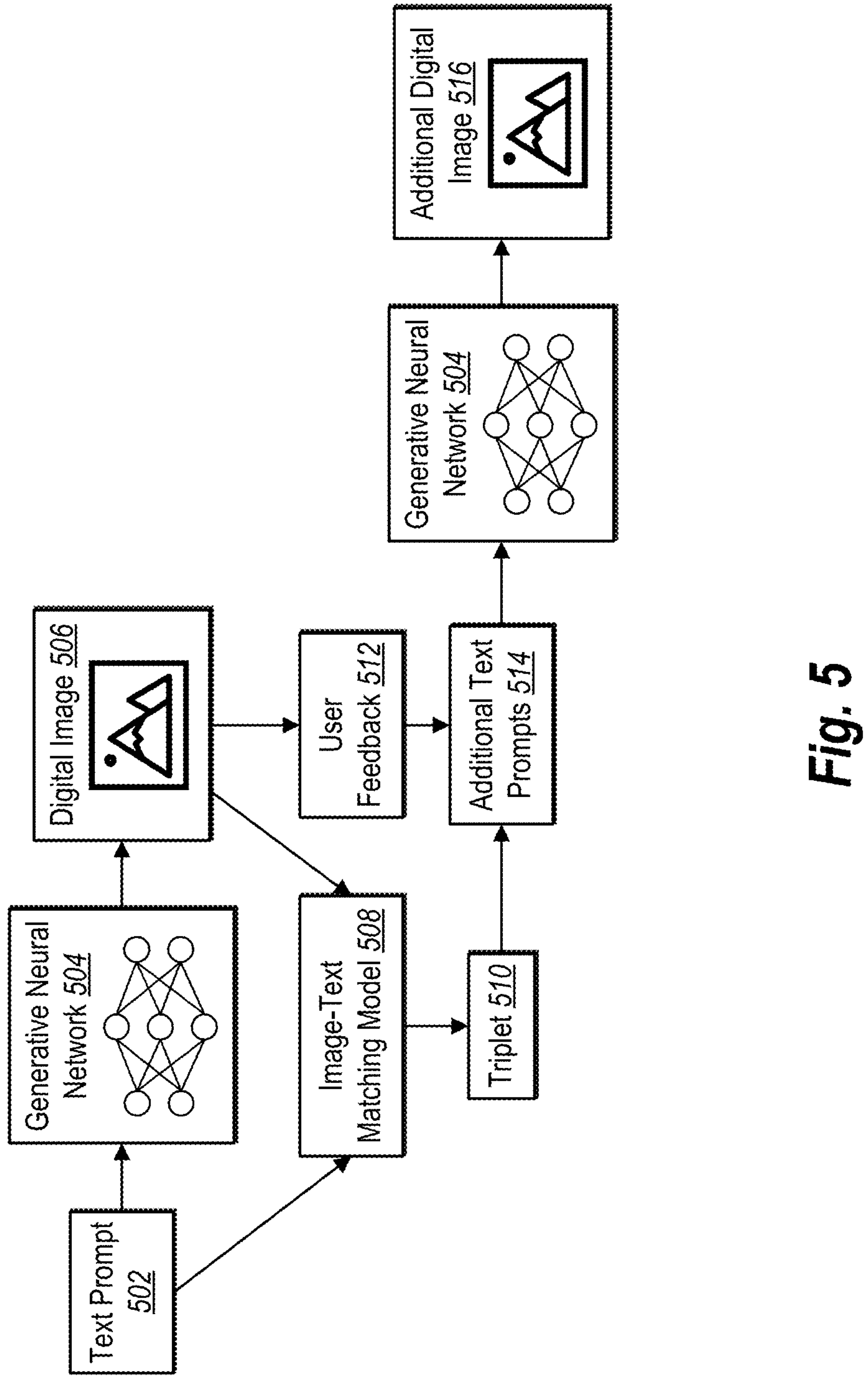
FIG. 5 illustrates a diagram of the image-text correction system correcting mismatches between a text prompt and a generated image in an image generation pipeline in accordance with one or more implementations.

In one or more embodiments, as mentioned, the image-text correction system 102 detects and corrects mismatches in an image generation pipeline. FIG. 5 illustrates an example of the image-text correction system 102 correcting a digital image generated by a generative neural network via one or more computing operations. In one or more embodiments, as illustrated in FIG. 5, the image-text correction system 102 utilizes user feedback to determine whether to perform digital image editing in the image generation pipeline.

As illustrated in FIG. 5, the image-text correction system 102 determines a text prompt 502 for generating digital image content. Specifically, text prompt 502 serves as an input to a generative neural network 504 to generate a digital image 506. For example, the generative neural network 504 includes a diffusion-based generative neural network to generate digital image content based on text prompts. In some embodiments, the text prompt 502 includes one or more natural language phrases. In some embodiments, the text prompt 502 includes one or more structured text segments.

In one or more embodiments, in response to the generative neural network 504 generating the digital image 506, or in response to a request to analyze the digital image 506 output by the generative neural network 504, the image-text correction system 102 determines whether the digital image 506 includes accurate digital image content relative to text content of the text prompt 502. For example, the image-text correction system 102 utilizes an image-text matching model 508 to compare the text prompt 502 to the digital image 506. To illustrate, the image-text correction system 102 utilizes the image-text matching model 508 to determine whether the text prompt 502 and the digital image 506 include any semantic discrepancies.

In some embodiments, the image-text correction system 102 utilizes the image-text matching model 508 to generate a triplet 510 in connection with detecting a semantic discrepancy between the text prompt 502 and the digital image 506. In particular, as previously described, the image-text correction system 102 generates the triplet 510 to include an indication of a detected mismatch, an aspect class of the mismatch, and an indication of a correction for the mismatch. Accordingly, the image-text correction system 102 generates a triplet for each mismatch in the image-text pair containing the text prompt 502 and the digital image 506, which sometimes include a plurality of semantic discrepancies.

According to one or more embodiments, the image-text correction system 102 presents information associated with the triplet 510 for display via a client device. For example, the image-text correction system 102 generates the triplet 510 and displays the elements of the triplet in a graphical user interface displaying the digital image 506. Thus, the image-text correction system 102 provides information relevant to the image-text pair for display within the graphical user interface. For example, the image-text correction system 102 provides information from the triplet 510 as an overlay within a graphical user interface, by highlighting the mismatch within the graphical user interface (e.g., by highlighting a text element or a visual element), or otherwise indicating the mismatch, aspect class, and/or correction.

In one or more embodiments, the image-text correction system 102 optionally utilizes user feedback 512 in connection with performing one or more operations to fix one or more semantic discrepancies in the image-text pair. For instance, the image-text correction system 102 provides an indication of a detected mismatch in a graphical user interface and requests that a user to provide feedback indicating whether the user would like to correct the mismatch according to the information in the triplet 510. To illustrate, the image-text correction system 102 requests the user feedback 512 for one or more mismatches detected in the image-text pair and, in response to the user feedback 512 including a request to correct a mismatch, the image-text correction system 102 performs one or more additional operations to correct the mismatch. In some embodiments, the user feedback 512 includes a selection of a particular method of correcting the mismatch (e.g., by utilizing additional image generation operations or image editing operations).

In some embodiments, the image-text correction system 102 generates a plurality of possible corrections for a single mismatch. For example, the image-text correction system 102 utilizes an image-text matching model to generate a plurality of triplets including a plurality of different possible corrections for a single mismatch based on an aspect class of the mismatch. To illustrate, the image-text correction system 102 trains the image-text matching model to generate a plurality of possible corrections for each mismatch based on probabilities of the possible corrections. As an example, the image-text correction system 102 generates a plurality of possible corrections including various synonyms or different ways of describing a single concept. Thus, in some embodiments, the user feedback 512 includes a selection of a possible correction (e.g., from the plurality of triplets).

According to one or more embodiments, as illustrated in FIG. 5, the image-text correction system 102 utilizes an image generation pipeline to further modify a digital image based on a detected mismatch in an image-text pair. Specifically, the image-text correction system 102 generates an additional text prompt 514 based on the triplet 510. For example, the image-text correction system 102 generates the additional text prompt 514 to include instructions for modifying a portion of the digital image 506 (e.g., one or more visual elements) according to the mismatch and the correction in the triplet 510. To illustrate, the image-text correction system 102 generates the additional text prompt 514 to include natural language text or structured text to modify the digital image 506 or generate a new digital image with the corrected element. As an example, the image-text correction system 102 generates the additional text prompt 514 for a mismatch of a "clear sky" and a "cloudy sky" in the image-text pair as "Replace the clear sky with a cloudy sky."

In one or more embodiments, the image-text correction system 102 provides the additional text prompt 514 to the generative neural network 504. Accordingly, the generative neural network 504 generates a modified digital image 516 based on the additional text prompt 514. In one or more embodiments, the generative neural network 504 generates a new image based on combined context from the text prompt 502 and the additional text prompt 514. Alternatively, the generative neural network 504 modifies a portion of the digital image 506 to generate the modified digital image 516.

In alternative embodiments, the image-text correction system 102 utilizes one or more other image editing operations to generate the modified digital image 516. For instance, the image-text correction system 102 utilizes an image filter, a brush, or other image editing operation or combination of image editing operations to modify a mismatched portion of the digital image 506. To illustrate, the image-text correction system 102 determines that a mismatch includes a color mismatch between an object in the text prompt 502 and a corresponding object in the digital image 506 and utilizes an image editing operation to modify the color of the object in the digital image.

In some embodiments, the image-text correction system 102 determines one or more additional image editing operations based on the aspect class of a mismatch. To illustrate, in response to determining that the mismatch corresponds to an attribute, the image-text correction system 102 selects a first image editing operation. Furthermore, in response to determining that the mismatch corresponds to an entity, the image-text correction system 102 selects a second image editing operation.

According to one or more embodiments, the image-text correction system 102 utilizes the triplet 510 to generate computing instructions for one or more devices to use in correcting a detected mismatch. For instance, the image-text correction system 102 issues a computing instruction (e.g., an API call) to a computing device to execute an image generation operation by providing the additional text prompt 514 to the generative neural network 504. Alternatively, the image-text correction system 102 issues a computing instruction to a computing device via an image editing application to execute one or more image editing operations, including generating a mask for a portion of the digital image 506 and performing one or more image content modification operations such as color replacement, warping, or object replacement/insertion operations.

In some embodiments, the image-text correction system 102 provides the additional text prompt 514 to a large language model to generate computing instructions for generating the modified digital image 516. For example, rather than providing the additional text prompt 514 to an image generation neural network, the image-text correction system 102 provides the additional text prompt 514 to a large language model for determining one or more image editing operations and the corresponding computing instructions. Thus, the image-text correction system 102 leverages the large language model to automatically determine a set of operations, computing instructions, and one or more devices for correcting the mismatch.

According to some embodiments a large language model includes an artificial intelligence model capable of processing and generating natural language text or other language-based prompts using language understanding. In particular, large language models are trained on large amounts of data to learn patterns and rules of language. As such, a large language model post-training is capable of generating output predictions that indicate visualization structures. Further, in some embodiments, a large language model includes or refers to one or more transformer-based neural networks capable of processing language-based prompts (e.g., natural language text) to generate outputs that range from predictive outputs, analyses, or combinations of data within stored content items. In particular, a large language model includes parameters trained (e.g., via deep learning) on large amounts of data to learn patterns and rules of language for summarizing and/or generating digital content. In one or more embodiments, the software action planning system utilizes a large language model as described by Jivat Neet Kaur, Sumit Bhatia, Milan Aggarwal, Rachit Bansal, and Balaji Krishnamurthy in "LM-CORE: Language Models with Contextually Relevant External Knowledge" in arXiv: 2208.06458v1, 2022, which is herein incorporated by reference in its entirety. Furthermore, in some embodiments, the large language model has access to one or more image editing applications and is trained to generate computing instructions for executing various image editing operations in the image editing applications.

Figure 6:
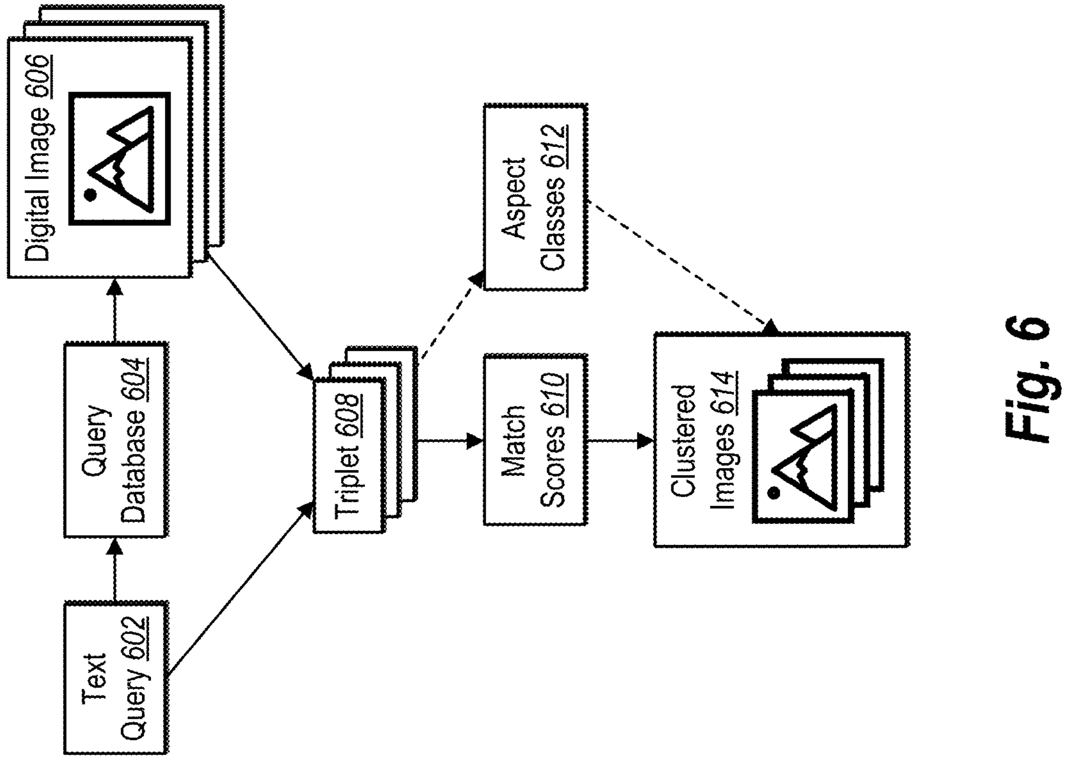
FIG. 6 illustrates a diagram of the image-text correction system clustering images in an image search based on detected mismatches in accordance with one or more implementations.

As mentioned, the image-text correction system 102 also provides improved image search results utilizing mismatch and correction of image-text pairs. FIG. 6 illustrates an embodiment in which the image-text correction system 102 uses mismatch and correction operations to modify/group image search results. In particular, FIG. 6 illustrates that the image-text correction system 102 detects semantic discrepancies in image-text pairs and uses information about the discrepancies to cluster sets of images in the image results.

As illustrated in FIG. 6, the image-text correction system 102 determines an image-text pair (or a plurality of image-text pairs) based on an image search query via an image search engine. Specifically, the image-text correction system 102 determines a text query 602 to an image search engine that performs an image search on a query database 604. The image search engine returns a plurality of digital images (e.g., digital image 606) to the text query 602, resulting in a plurality of image-text pairs including the text query 602 and the separate digital images.

In one or more embodiments, the image-text correction system 102 generates triplets for the digital images in the search results. For example, the image-text correction system 102 generates a triplet 608 for the image-text pair including the text query 602 and the digital image 606. To illustrate, the image-text correction system 102 generates the triplet 608 to include a mismatch, aspect class, and correction for the image-text pair.

According to one or more embodiments, the image-text correction system 102 utilizes the triplet 608 to customize search results based on the text query 602. For instance, the image-text correction system 102 generates match scores 610 for the digital images based on the corresponding triplets. To illustrate, the image-text correction system 102 generates the match scores 610 based on similarities of the digital images to the text queries according to the number of triplets for each of the digital images. More specifically, the image-text correction system 102 generates a higher match score for an image-text pair that has zero or one triplets and a lower match score for an image-text pair that has more than one triplet. In additional examples, the image-text correction system 102 generates a match score for an image-text pair based on a percentage or proportion of elements of the text query 602 and the corresponding digital image that match (e.g., five out of seven elements has a higher match score than four out of seven).

In one or more additional embodiments, the image-text correction system 102 generates the match scores 610 based on the contents of each triplet (e.g., based on aspect classes 612). In particular, in some embodiments, the image-text correction system 102 weights certain aspect classes differently than other aspect classes, resulting in certain types of mismatches indicating a worse or better match than other types of mismatches. To illustrate, the image-text correction system 102 weights entities higher than attributes such that, for a text query for a "red car on a road," a digital image with a blue car on a road scores higher than a digital image with a red bicycle on a road. Additionally, in some embodiments, the image-text correction system 102 generates a sum (e.g., a weighted sum) of each of individual scores of each of the elements in an image-text pair to determine an overall match score for the image-text pair. In some embodiments, the image-text correction system 102 also generates a match score for an individual element of an image-text pair based on a semantic similarity of the elements.

As illustrated, the image-text correction system 102 utilizes the match scores 610 to determine clustered images 614 from the image search results. Specifically, the image-text correction system 102 utilizes the match scores 610 to cluster sets of digital images of the digital images returned from the query database 604. For example, the image-text correction system 102 clusters images that have similar match scores, such as by clustering images between certain threshold scores (e.g., 60-79.9 or 80-89.9 on a 100-point scale). Additionally, in some examples, the image-text correction system 102 utilizes another clustering method, such as k-means clustering based on the match scores 610 of the returned results. Furthermore, in some embodiments, the image-text correction system 102 selects a top-N number of digital images based on the match scores 610 and clusters only those results.

In one or more alternative embodiments, the image-text correction system 102 utilizes the aspect classes 612 to determine the clustered images 614. In particular, in addition to, or instead of, clustering images based on the match scores 610, the image-text correction system 102 clusters the images based on the aspect classes 612. For instance, the image-text correction system 102 clusters images that have similar types of mismatches (e.g., attributes or entities). As an example, the image-text correction system 102 clusters images that are mismatched in relation to the color of an entity and separately clusters images that are mismatched in relation to the type of entity. In additional embodiments, within each aspect class, the image-text correction system 102 also ranks the clustered images based on the match scores 610.

In one or more additional embodiments, the image-text correction system 102 modifies a text string based on detected mismatches and corrections. For example, the image-text correction system 102 determines one or more replacement phrases to replace one or more phrases in the text string based on the mismatches. To illustrate, the image-text correction system 102 determines the replacement phrase(s) for suggesting a new text query to improve search results in the embodiment of FIG. 6. In one or more embodiments, the image-text correction system 102 generates instructions to generate a modified text string including replacement phrases to obtain a new digital image (e.g., for providing to a computing device executing an image search). Alternatively, in some embodiments, the image-text correction system 102 determines the replacement phrase(s) for correcting a caption of a digital image in an image captioning system.

Figure 7:
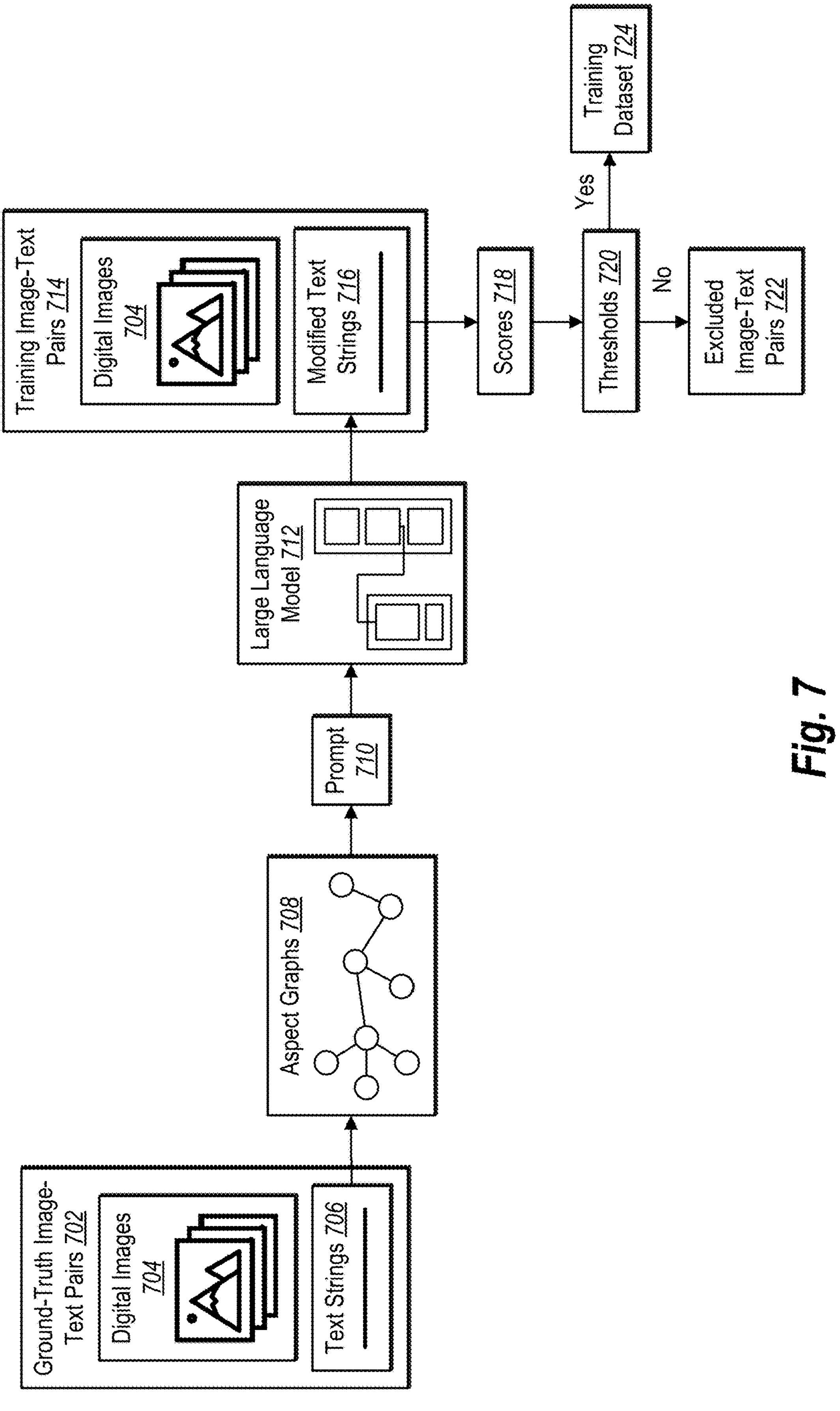
FIG. 7 illustrates a diagram of the image-text correction system generating a training dataset by synthesizing mismatched image-text pairs in accordance with one or more implementations.

As mentioned above, the image-text correction system 102 utilizes an image-text matching model to detect and correct mismatches in image-text pairs. In one or more embodiments, the image-text correction system 102 trains the image-text matching model to generate triplets utilizing a training dataset of synthesized mismatched image-text pairs. FIG. 7 illustrates an embodiment of the image-text correction system 102 generating a training dataset including synthesized mismatched image-text pairs using aspect-based changes to image-text pairs.

Specifically, as illustrated in FIG. 7, the image-text correction system 102 determines ground-truth image-text pairs 702 including digital images 704 and text strings 706. In one or more embodiments, the ground-truth image-text pairs 702 include images and text that are verified to have no semantic discrepancies. For example, the ground-truth image-text pairs 702 include manually labeled or manually verified image-text pairs.

In one or more embodiments, the image-text correction system 102 determines aspect graphs 708 for the ground-truth image-text pairs 702. In one or more embodiments, an aspect graph includes a graph representation of a text string based on parts-of-speech components of the text string and natural language understanding of relationships between the parts-of-speech components. For example, an aspect graph includes a plurality of nodes corresponding to text elements (e.g., words or phrases) corresponding to separate semantic concepts and a plurality of edges connecting the nodes based on relationships between the semantic concepts. Furthermore, in one or more embodiments, the image-text correction system 102 extracts the aspect graphs 708 from the text strings 706 utilizing a large language model or other natural language processing neural network. Additionally, in some embodiments, the image-text correction system 102 assigns aspect classes to the nodes to indicate whether the nodes correspond to an entity, attribute, relationship, or number. In one or more embodiments, each node in an aspect graph is atomic.

Figure 8:
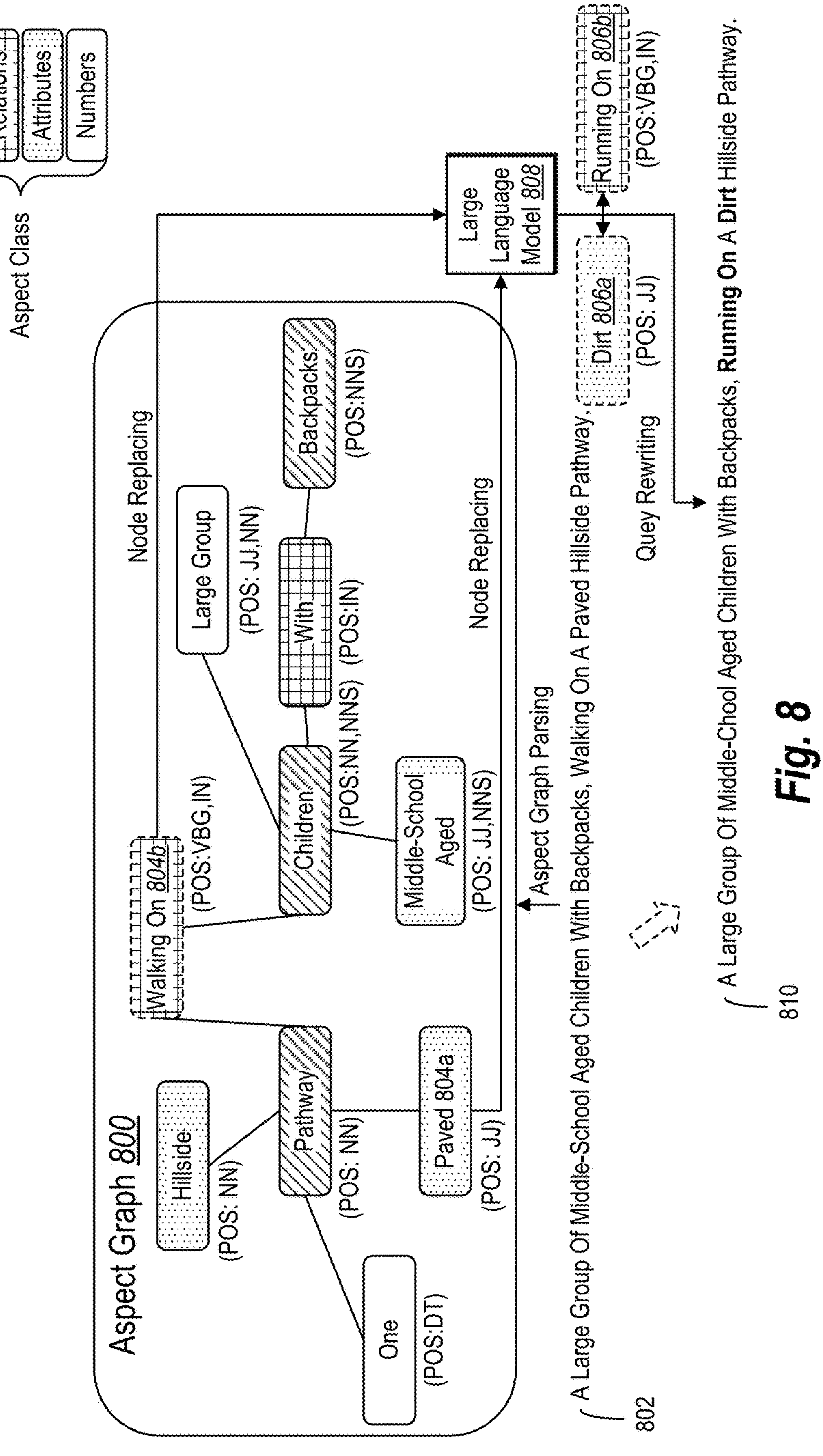
FIG. 8 illustrates a diagram of the image-text correction system modifying an aspect graph of an image-text pair in accordance with one or more implementations.

In some embodiments, the image-text correction system 102 generates a training image-text pair from a ground-truth image-text pair by modifying an aspect graph of the image-text pair. Specifically, the image-text correction system 102 modifies the aspect graph to create a mismatch in the image-text pair. For example, the image-text correction system 102 replaces one or more nodes in the aspect graph with one or more other nodes of the same aspect class(es). FIG. 8 and the corresponding description provide an example of aspect graph modification to generate an image-text pair with one or more mismatched nodes.

In one or more embodiments, the image-text correction system 102 utilizes a neural network to modify the aspect graphs 708. For example, as illustrated in FIG. 7, the image-text correction system 102 generates a prompt 710 to provide to a large language model 712 to replace one or more nodes in each of the aspect graphs 708. To illustrate, the image-text correction system 102 generates the prompt 710 requesting that the large language model 712 randomly replace one or more nodes in each of the aspect graphs 708 with counterfactual descriptions while maintaining the same parts-of-speech tags relative to the replaced nodes. Accordingly, the image-text correction system 102 utilizes the large language model 712 to randomly replace a subset of nodes (e.g., from 1-3 nodes) in each aspect graph with corresponding counterfactual nodes.

According to one or more embodiments, the image-text correction system 102 utilizes the modified aspect graphs to generate training image-text pairs 714. For example, the image-text correction system 102 generates the training image-text pairs 714 by converting the modified aspect graphs to modified text strings 716 including replacement elements based on the replaced nodes. More specifically, the image-text correction system 102 translates the modified aspect graphs back to text strings according to the nodes and edges in the modified aspect graphs to generate the modified text strings 716. Thus, the training image-text pairs 714 include the digital images 704 paired with the modified text strings 716, resulting in mismatches in the training image-text pairs 714.

Additionally, in one or more embodiments, the image-text correction system 102 utilizes one or more additional operations to refine the training image-text pairs for including in a training dataset 724. For example, the image-text correction system 102 utilizes a data debiasing operation to reduce artifacts in the training dataset 724. Specifically, the image-text correction system 102 generates scores 718 representing different semantic aspects of the training image-text pairs 714. In one or more embodiments, the image-text correction system 102 generates a first score to indicate a plausibility of a modified text string to indicate whether the modified text string makes sense logically based on real-world knowledge. Additionally, in some embodiments, the image-text correction system 102 generates a second score based on a grammar composition of a modified text string. In further embodiments, the image-text correction system 102 generates a third score indicating a similarity between a digital image and a modified text string in a training image-text pair.

In one or more embodiments, the image-text correction system 102 generates the first score utilizing a scoring model that takes a statement and returns a continuous score based on training data including correct and incorrect statements. To illustrate, the scoring model includes a large language model (e.g., utilizing the same architecture of the large language model 712 and trained on a different dataset). In one or more embodiments, the image-text correction system 102 generates the second score utilizing a natural language processing model trained using attacks constructed from a task-specific goal function, a set of constraints, a transformation, and a search method. In one or more embodiments, the image-text correction system 102 generates the third score utilizing a vision-language model such as the image-text matching model to compare the digital images 704 and the modified text strings 716 in a unified feature space.

In response to generating the scores 718, in one or more embodiments, the image-text correction system 102 determines whether any of the training image-text pairs 714 have errors, contradict commonsense, or present significant discrepancies that lead to artifacts that would lead to inaccuracies in the results. For example, the image-text correction system 102 utilizes thresholds 720 (e.g., separate thresholds for each of the scores 718) to determine whether the training image-text pairs 714 meet a minimum standard for the training dataset 724. In response to determining that a subset of the training image-text pairs 714 do not meet one or more of the thresholds 720, for instance, the image-text correction system 102 determines that the subset belongs to excluded image-text pairs 722, which are excluded from the training dataset 724. In additional embodiments, the image-text correction system 102 utilizes manually identified image-text pairs to exclude from the training dataset 724 according to various criteria.

As mentioned, FIG. 8 illustrates an example of an aspect graph 800 and operations to modify the aspect graph 800. Specifically, the image-text correction system 102 determines the aspect graph 800 from a text string 802 including a description of a digital image. More specifically, the text string 802 includes a ground-truth text string corresponding to a ground-truth image, such that text elements of the text string 802 and visual elements of the digital image accurately correspond to each other. As illustrated, the aspect graph 800 includes a plurality of nodes connected via a plurality of edges according to the parts-of-speech characteristics or components of the text elements (e.g., noun or adjective) in the text string 802 and the relationships between the text elements. Additionally, the nodes include aspect classes based on the parts-of-speech components.

In one or more embodiments, the image-text correction system 102 utilizes a large language model 808 to replace one or more nodes in the aspect graph 800 with one or more other nodes. For instance, the image-text correction system 102 determines a first node 804*a* and a second node 804*b* corresponding to different text elements of the text string 802. To illustrate, the first node 804*a* includes an attribute aspect type and the second node 804*b* includes a relation aspect type. As mentioned, the image-text correction system 102 utilizes the large language model 808 to select the nodes to replace, such as via random sampling.

Furthermore, the image-text correction system 102 utilizes the large language model 808 to replace the selected nodes with counterfactual examples. Specifically, the image-text correction system 102 utilizes the large language model 808 to replace the first node 804*a* with a first modified node 806*a* of the same aspect class. Additionally, the image-text correction system 102 utilizes the large language model 808 to replace the second node 804*b* with a second modified node 806*b* of the same aspect class (e.g., by replacing "paved" with "dirt" and "walking on" with "running on"). The image-text correction system 102 generates a modified text string 810 by translating the modified aspect graph back to text. The image-text correction system 102 stores the modified text string 810 with the digital image as a training image-text pair.

Figure 9:
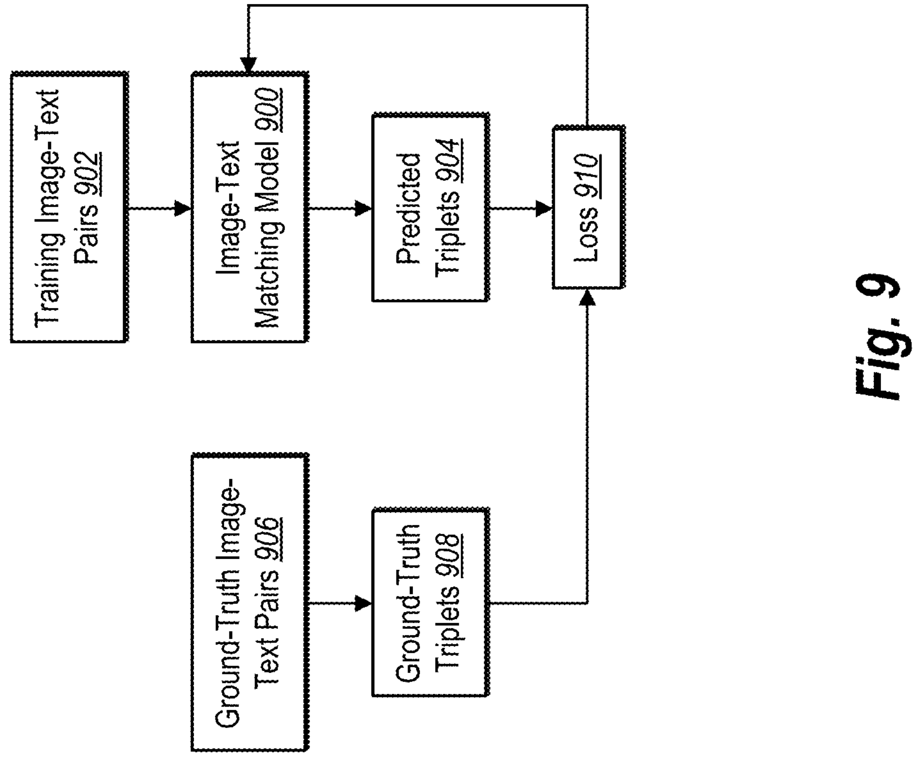
FIG. 9 illustrates a diagram of the image-text correction system training an image-text matching model in accordance with one or more implementations.

FIG. 9 illustrates an embodiment of the image-text correction system 102 training an image-text matching model 900 utilizing a dataset of mismatched training image-text pairs. In one or more embodiments, the image-text correction system 102 determines training image-text pairs 902 as described above with respect to FIGS. 7-8, such that each image-text pair includes at least one mismatched text element and visual element. Additionally, the image-text correction system 102 utilizes the image-text matching model 900 to generate predicted triplets 904 from the training image-text pairs 902. For instance, the image-text correction system 102 utilizes the image-text matching model 900 to generate triplets including predicted mismatches, predicted aspect classes of the mismatches, and predicted corrections for the mismatches.

Additionally, in connection with generating the predicted triplets 904, the image-text correction system 102 determines ground-truth image-text pairs 906 corresponding to the training image-text pairs 902. Specifically, the training image-text pairs 902 include modified versions of the ground-truth image-text pairs 906 (e.g., utilizing the processes described in relation to FIGS. 7-8. The image-text correction system 102 determines ground-truth triplets 908 based on the ground-truth image-text pairs 906, such as by extracting the corresponding text elements and visual elements from the text strings and digital images, respectively, of the ground-truth image-text pairs.

Furthermore, in one or more embodiments, the image-text correction system 102 determines a loss 910 based on the ground-truth triplets 908 and the predicted triplets 904. In particular, the image-text correction system 102 generates the loss 910 by determining differences between the predicted triplets 904 and the ground-truth triplets 908. In some examples, the image-text correction system 102 utilizes a loss function that determines differences between two vectors or arrays (e.g., a ground-truth triplet and a predicted triplet). To illustrate, the image-text correction system 102 utilizes a loss function with a training object for image $I_i$ and caption $C_i$, and the output aspect representations $$P_i = \{c_j, p_j, o_j\}_{j=1}^{M}$$

as:

$$\mathcal{L} = -\sum_{\mathcal{D}} \sum_{t=1}^{M} \log p\left(P_t \,\middle|\, [C_i:I_i], P_{\leq t-1}\right)$$

In one or more embodiments, the image-text correction system 102 utilizes the loss 910 to train the image-text matching model 900. Specifically, the image-text correction system 102 modifies parameters of the image-text matching model 900 to reduce differences between the predicted triplets 904 and the ground-truth triplets 908 according to the loss 910. In some embodiments, the image-text correction system 102 utilizes an iterative training process to generate new predicted triplets, determine an updated loss, and further modify the parameters of the image-text matching model 900.

In one or more embodiments, the image-text correction system 102 also utilizes a scoring model to evaluate the accuracy of the image-text matching model. For example, the image-text correction system 102 leverages an intersection over union metric to measure the accuracy of the predicted triplets 904 relative to the ground-truth triplets 908. Specifically, the image-text correction system 102 evaluates mismatched aspect phrase detection at the character level and the semantic level. For a lexical similarity evaluation, the image-text correction system 102 utilizes a character level F-score (chrF) and an F1-score for character n-gram matches. For a semantic level evaluation, the image-text correction system 102 determines precision and recall by matching words in candidate and reference sentences via cosine similarity (BERT score).

Accordingly, given a predicted mismatched aspect $$P_i = \{c_j, p_j, o_j\}_{j=1}^{M} \; (i \in |\mathcal{D}|)$$

and the corresponding ground truth $$G_i = \{c'_j, p'_j, o'_j\}_{j=1}^{M'} \; (i \in |\mathcal{D}|),$$

in which M represents the number of mismatched aspects and M' is the number of ground-truth mismatched aspects, the combined detection score $\text{Score}_{D_j}$ is determined as:

$$\text{Score}_{D_j} = \frac{BERTScore(p_j, p'_j) + chrF(p_j, p'_j)}{2}$$

In one or more embodiments, aspect phrase correction is an open-ended generation task. Accordingly, the image-text correction system 102 calculates the BERT score to evaluate the semantic similarity of the generated corrections $o_i$ and the ground truth $$o'_i.$$

The correction score $\text{Score}_{C_j}$ is represented as:

$$\text{Score}_{C_j} = BERTScore(o_j, o'_j).$$

Furthermore, the total score of a predicted aspect is the weighted sum of the scores of the three elements in the mismatched aspect representation as:

$$\text{Score}_{Aspect_j} = W_{C_a} \cdot EM(c_j, c'_j) + W_{D_e} \cdot \text{Score}_{D_j} + W_{C_o} \cdot \text{Score}_{C_j}$$

in which $W_{C_a}$, $W_{D_e}$, and $W_{C_o}$ are the weights of the EM, $\text{Score}_{D_j}$, and $\text{Score}_{C_j}$, respectively. For example, in some embodiments, the weights are $W_{C_a}=0.2$, $W_{D_e}=0.4$, and $W_{C_o}=0.4$.

To compute an intersection over union ("IoU") of an aspect representation, the image-text correction system 102 sets a threshold to match the predictions with the ground truth, such that if $\text{Max}(\text{Score}_{Aspect_1}, \ldots, \text{Score}_{Aspect_M}) \geq T$, the predicted triplet matches the ground truth. For each aspect representation prediction, the image-text correction system 102 computes the final score as:

$$\text{Score}_{Aspect_j} = \begin{cases} \text{Score}_{Aspect_k} & \text{if } \max\left(\{\text{Score}_{Aspect_k}\}_{k=1}^{M'}\right) \geq T, \\ 0 & \text{else} \end{cases}$$

with the final calculation of the mismatched aspect image-text match intersection over union ("ITM-IoU") as:

$$ITM - IoU = \frac{\sum_{j=1}^{M} \text{Score}_{Aspect_j}}{M} \times \frac{|P_i \cap G_i|}{|P_i \cup G_i|}$$

where $|P_i \cap G_i|$ denotes the number of matched triplets of data i, and $|P_i \cup G_i| = |P_i| + |G_i| - |P_i \cup G_i|$.

In some embodiments, by determining the ITM-IoU for sets of predicted triplets, the image-text correction system 102 determines the accuracy of the image-text matching model 900. Furthermore, in some embodiments, the image-text correction system 102 utilizes the above metric in determining the loss 910. In additional embodiments, the image-text correction system 102 utilizes the ITM-IoU metric or a portion of the ITM-IoU metric to cluster images in a set of image search results, as described previously.

Figure 10:
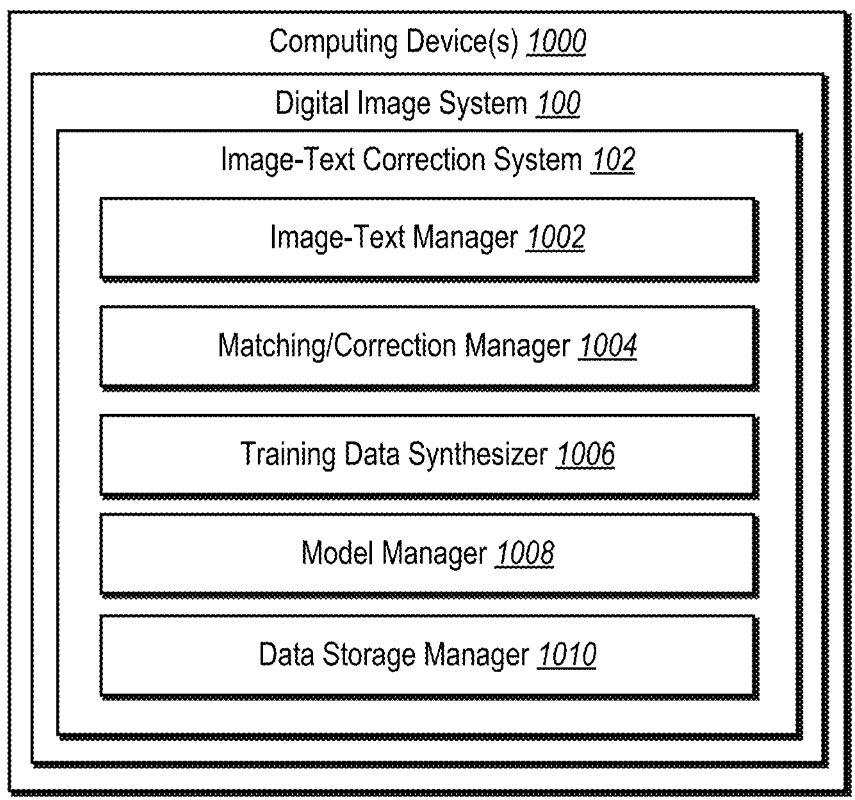
FIG. 10 illustrates a diagram of an example of the image-text correction system in accordance with one or more implementations.

FIG. 10 illustrates a detailed schematic diagram of an embodiment of the image-text correction system 102 described above. As shown, the image-text correction system 102 is implemented in a digital image system 110 on computing device(s) 1000 (e.g., a client device and/or server device as described in FIG. 1, and as further described below in relation to FIG. 12). Additionally, the image-text correction system 102 includes, but is not limited to, an image-text manager 1002, a matching/correction manager 1004, a training data synthesizer 1006, a model manager 1008, and a data storage manager 1010. In one or more embodiments, the image-text correction system 102 is implemented on any number of computing devices. For example, the image-text correction system 102, in one or more embodiments, is implemented in a distributed system of server devices for image-text processing. Alternatively, the image-text correction system 102 is also implemented within one or more additional systems. For example, the image-text correction system 102, in one or more embodiments, is implemented on a single computing device such as a single client device.

In one or more embodiments, each of the components of the image-text correction system 102 is in communication with other components using any suitable communication technologies. Additionally, the components of the image-text correction system 102 are capable of being in communication with one or more other devices including other computing devices of a user, server devices (e.g., cloud storage devices), licensing servers, or other devices/systems. It will be recognized that although the components of the image-text correction system 102 are shown to be separate in FIG. 10, any of the subcomponents may be combined into fewer components, such as into a single component, or divided into more components as may serve a particular implementation. Furthermore, although the components of FIG. 10 are described in connection with the image-text correction system 102, at least some of the components for performing operations in conjunction with the image-text correction system 102 described herein are implemented on other devices within the environment in other embodiments.

In some embodiments, the components of the image-text correction system 102 include software, hardware, or both. For example, the components of the image-text correction system 102 include one or more instructions stored on a computer-readable storage medium and executable by processors of one or more computing devices (e.g., the computing device(s) 1000). When executed by the one or more processors, the computer-executable instructions of the image-text correction system 102 cause the computing device(s) 1000 to perform the operations described herein. Alternatively, the components of the image-text correction system 102 include hardware, such as a special purpose processing device to perform a certain function or group of functions. Additionally, or alternatively, the components of the image-text correction system 102 include a combination of computer-executable instructions and hardware.

Furthermore, the components of the image-text correction system 102 performing the functions described herein with respect to the image-text correction system 102 may, for example, be implemented as part of a stand-alone application, as a module of an application, as a plug-in for applications, as a library function or functions that may be called by other applications, and/or as a cloud-computing model. Thus, the components of the image-text correction system 102 may be implemented as part of a stand-alone application on a personal computing device or a mobile device. Alternatively, or additionally, the components of the image-text correction system 102 may be implemented in any application that provides image-text processing, including, but not limited to ADOBE® PHOTOSHOP® and ADOBE® CREATIVE CLOUD® software.

As illustrated, the image-text correction system 102 includes an image-text manager 1002 to manage image-text pairs. For example, the image-text manager 1002 determines image-text pairs from an image generation pipeline (e.g., including text prompts to generate images via a generative neural network). In other examples, the image-text manager 1002 determines image-text pairs from an image captioning pipeline.

In one or more embodiments, the image-text correction system 102 includes a matching/correction manager 1004 to generate mismatches and corrections for image-text pairs. For instance, the matching/correction manager 1004 utilizes an image-text matching model to generate triplets for image-text pairs by detecting mismatches, determining aspect classes, and generating corrections for the image-text pairs. In some embodiments, the matching/correction manager 1004 also utilizes the triplets to modify digital images or text strings or to generate instructions for another computing device to modify digital images or text strings.

The image-text correction system 102 includes a training data synthesizer 1006 to generate synthesized training data for training one or more models. For example, the training data synthesizer 1006 utilizes one or more neural networks to extract and modify aspect graphs from text strings in image-text pairs. To illustrate, the training data synthesizer 1006 utilizes a large language model to modify aspect graphs by replacing nodes in the aspect graphs with counterfactual examples.

Additionally, the image-text correction system 102 includes a model manager 1008 to manage and train one or more image-text matching models. For example, the model manager 1008 determines loss functions for modifying parameters of the image-text matching models based on synthesized training image-text pairs. In additional embodiments, the model manager 1008 evaluates the performance of the image-text matching models utilizing an ITM-IoU metric that indicates the accuracy of the image-text matching models.

The image-text correction system 102 also includes a data storage manager 1010 (that comprises a non-transitory computer memory) that stores and maintains data associated with processing image-text data. For example, the data storage manager 1010 stores digital images and digital text in image-text pairs. The data storage manager 1010 also stores triplets, aspect graphs, modified text/image data, and model/training data during training or inference operations utilizing one or more image-text matching models.

Figure 11:
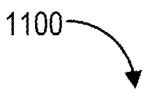
FIG. 11 illustrates a flowchart of a series of acts for aspect-based detection and correction of mismatches in image-text pairs in accordance with one or more implementations.
Figure 11:
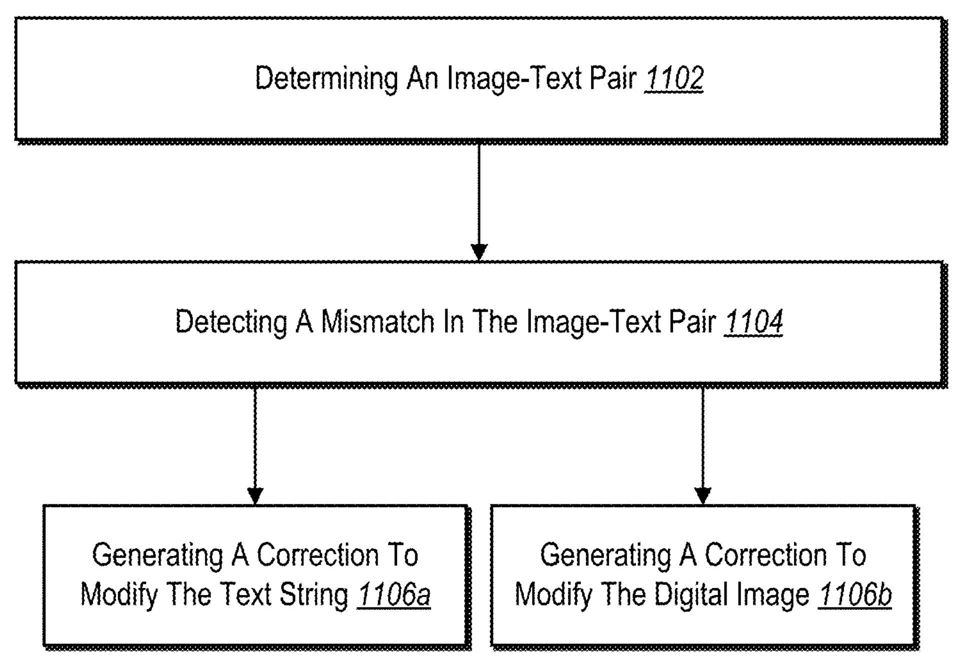

Turning now to FIG. 11, this figure shows a flowchart of a series of acts 1100 of detecting and correcting mismatches in image-text pairs utilizing aspect-based machine-learning. While FIG. 11 illustrates acts according to one embodiment, alternative embodiments may omit, add to, reorder, and/or modify any of the acts shown in FIG. 11. The acts of FIG. 11 are part of a method. Alternatively, a non-transitory computer readable medium comprises instructions, that when executed by one or more processors, cause the one or more processors to perform the acts of FIG. 11. In still further embodiments, a system includes a processor or server configured to perform the acts of FIG. 11.

As shown, the series of acts 1100 includes act 1102 of determining an image-text pair. The series of acts 1100 includes act 1104 of detecting a mismatch in the image-text pair. Additionally, the series of acts 1100 includes act **1106*a* of generating a correction to modify the text string. Alternatively, the series of acts 1100 includes an act 1106*b*** of generating a correction to modify the digital image.

In one or more embodiments, act 1102 involves determining an image-text pair comprising a text string including a plurality of text elements and a digital image corresponding to the text string. Act 1104 involves detecting, utilizing an image-text matching model, one or more mismatches between the plurality of text elements of the text string and the digital image. Act 1106*a* and act 1106*b* involve generating, utilizing the image-text matching model, one or more corrections to modify the text string or the digital image according to the one or more mismatches.

In one or more embodiments, the series of acts 1100 includes generating a triplet for the image-text pair comprising the one or more mismatches, the one or more corrections, and one or more aspect classes of one or more phrases corresponding to the one or more mismatches.

In one or more embodiments, the series of acts 1100 includes determining that one or more phrases in the text string do not match one or more visual elements in the digital image based on characteristics of the one or more visual elements in the digital image. In some embodiments, the series of acts 1100 includes determining one or more replacement phrases for replacing the one or more phrases in the text string based on the one or more mismatches. Additionally, the series of acts 1100 includes generating instructions to generate a modified text string including the one or more replacement phrases to obtain a new digital image.

In some embodiments, the series of acts 1100 includes generating a prompt to modify the one or more visual elements of the digital image based on the one or more mismatches. The series of acts 1100 also includes generating a modified digital image by providing the prompt to a generative neural network.

In one or more embodiments, the series of acts 1100 includes determining aspect graphs for a plurality of text strings in a plurality of ground-truth image-text pairs comprising the plurality of text strings and corresponding digital images, the aspect graphs comprising nodes representing words or phrases in the plurality of text strings connected according to parts-of-speech characteristics of the words or phrases. The series of acts 1100 also includes generating modified text strings by replacing a set of nodes in the aspect graphs with replacement nodes representing counterfactual descriptions of one or more words or phrases in relation to the corresponding digital images of the plurality of ground-truth image-text pairs. In some embodiments, the series of acts 1100 includes generating a plurality of scores based on plausibility of the modified text strings, grammar composition of the modified text strings, and similarities between the modified text strings and the corresponding digital images. The series of acts 1100 also includes excluding a subset of image-text pairs from the dataset in response to determining that the subset of image-text pairs with one or more of the plurality of scores below one or more threshold scores.

In some embodiments, the series of acts 1100 includes generating, utilizing the image-text matching model, predicted mismatches and corrections for the training image-text pairs in the dataset. The series of acts 1100 also includes modifying parameters of the image-text matching model to reduce a difference between the predicted mismatches and corrections and ground-truth mismatches and corrections according to the plurality of ground-truth image-text pairs.

In one or more embodiments, the series of acts 1100 includes determine a plurality of image-text pairs comprising the image-text pair based on an image search utilizing the text string. Additionally, the series of acts 1100 includes determining match scores between the text string and digital images of the plurality of image-text pairs based on mismatches detected in the plurality of image-text pairs utilizing the image-text matching model. The series of acts 1100 also includes clustering the digital images in a set of search results for the image search based on the match scores.

In one or more embodiments, the series of acts 1100 includes determining attributes of the digital images corresponding to the mismatches detected in the plurality of image-text pairs. The series of acts 1100 also includes clustering the digital images further based on the attributes of the digital images according to one or more aspects corresponding to the mismatches.

In one or more embodiments, the series of acts 1100 includes determining an image-text pair comprising a text string including a plurality of text elements and a digital image generated by a generative neural network from the text string. The series of acts 1100 further includes detecting, utilizing the image-text matching model, one or more mismatches between the plurality of text elements of the text string and the digital image. Additionally, the series of acts 1100 includes generating, utilizing the image-text matching model and in response to detecting the one or more mismatches, computing instructions to modify the digital image by replacing one or more elements corresponding to the one or more mismatches with one or more replacement elements.

In one or more embodiments, the series of acts 1100 includes determining, utilizing the image-text matching model, one or more aspect classes of one or more words or phrases corresponding to the one or more mismatches based on parts-of-speech characteristics of the one or more words or phrases. The series of acts 1100 further includes generating a triplet for the image-text pair comprising the one or more mismatches, the one or more aspect classes, and one or more corrections to the one or more mismatches.

In some embodiments, the series of acts 1100 includes detecting the one or more mismatches by determining that one or more phrases in the text string do not match one or more visual elements in the digital image based on characteristics of the one or more visual elements in the digital image.

In some embodiments, the series of acts 1100 includes determining the one or more replacement elements corresponding to one or more aspect classes of the one or more elements based on the one or more mismatches. The series of acts 1100 further includes generating a prompt to provide to the generative neural network to modify one or more visual elements of the digital image according to the one or more replacement elements. In one or more embodiments, the series of acts 1100 includes generating a prompt to modify the one or more visual elements of the digital image based on the one or more mismatches. The series of acts 1100 includes generating a modified digital image by providing the prompt to a generative neural network.

In one or more embodiments, the series of acts 1100 includes determining an aspect graph for a ground-truth text string corresponding to a corresponding digital image in a ground-truth image-text pair, the aspect graph comprising nodes representing words or phrases in the text string connected according to parts-of-speech characteristics of the words or phrases. In some embodiments, the series of acts 1100 includes generating a modified text string by replacing a node in the aspect graph with a replacement node representing a counterfactual description of a word or a phrase in relation to the corresponding digital image. Additionally, the series of acts 1100 includes generating a training image-text pair comprising the modified text string and the corresponding digital image.

In one or more embodiments, the series of acts 1100 also includes generating, utilizing the image-text matching model, one or more predicted mismatches and corrections for the training image-text pair. Additionally, the series of acts 1100 includes modifying parameters of the image-text matching model to reduce a difference between the one or more predicted mismatches and corrections and ground-truth mismatches and corrections according to the ground-truth image-text pair.

In one or more embodiments, the series of acts 1100 includes determining an image-text pair comprising a text string including a plurality of text elements and a digital image corresponding to a query comprising the text string. The series of acts 1100 also includes detecting, utilizing an image-text matching model comprising parameters trained on a dataset of training image-text pairs comprising mismatched elements, one or more mismatches between the plurality of text elements of the text string and the digital image. The series of acts 1100 further includes generating, utilizing the image-text matching model and in response to detecting the one or more mismatches, a modified text string by replacing one or more text elements of the text string corresponding to the one or more mismatches with one or more replacement elements correcting the one or more mismatches.

In some embodiments, the series of acts 1100 includes determining, utilizing the image-text matching model, that the image-text pair comprises a mismatch between a phrase of the text string and a visual element of the digital image. The series of acts 1100 further includes determining, utilizing the image-text matching model, a replacement phrase based on an aspect class of the phrase. The series of acts 1100 also includes generating, for display via a graphical user interface, a recommendation to generate the modified text string by replacing the phrase with the replacement phrase.

In one or more embodiments, the series of acts 1100 includes generating a training image-text pair by replacing one or more nodes of an aspect graph of a text string in a ground-truth image-text pair with one or more replacement nodes. The series of acts 1100 includes generating a predicted mismatch and correction for the training image-text pair. Additionally, the series of acts 1100 includes determining a loss based on a difference between the predicted mismatch and correction and a ground-truth mismatch and correction according to the training image-text pair. The series of acts 1100 includes modifying the parameters of the image-text matching model to reduce the loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
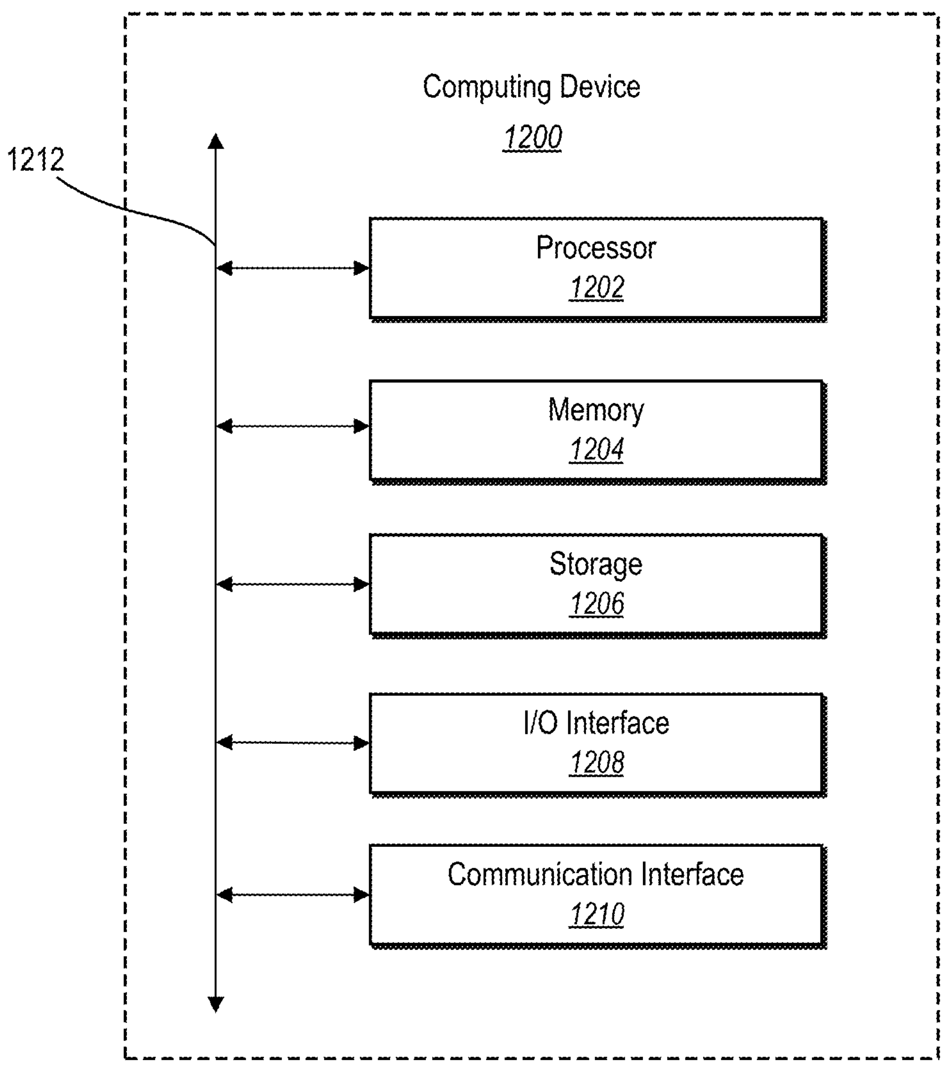
FIG. 12 illustrates a block diagram of an exemplary computing device in accordance with one or more implementations.

FIG. 12 illustrates a block diagram of exemplary computing device 1200 that may be configured to perform one or more of the processes described above. One will appreciate that one or more computing devices such as the computing device 1200 may implement the system(s) of FIG. 1. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example, and not by way of limitation, to execute instructions for dynamically modifying workflows, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions for performing the methods described herein.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example, and not by way of limitation, the communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:

determining, by at least one processor, an image-text pair comprising a text string including a plurality of text elements and a digital image corresponding to the text string;

detecting, by the at least one processor utilizing an image-text matching model comprising parameters modified based on mismatched image-text pairs generated by modifying aspect graphs of text strings of a set of image-text pairs, one or more mismatches between the plurality of text elements of the text string and the digital image; and generating, by the at least one processor utilizing the image-text matching model, one or more corrections to modify the text string or the digital image according to the one or more mismatches.

2. The computer-implemented method of claim 1, further comprising generating a triplet for the image-text pair comprising the one or more mismatches, the one or more corrections, and one or more aspect classes of one or more phrases corresponding to the one or more mismatches.

3. The computer-implemented method of claim 1, wherein detecting the one or more mismatches comprises determining that one or more phrases in the text string do not match one or more visual elements in the digital image based on characteristics of the one or more visual elements in the digital image.

4. The computer-implemented method of claim 3, wherein generating the one or more corrections comprises:

determining one or more replacement phrases for replacing the one or more phrases in the text string based on the one or more mismatches; and generating instructions to generate a modified text string including the one or more replacement phrases to obtain a new digital image.

5. The computer-implemented method of claim 3, wherein generating the one or more corrections comprises:

generating a prompt to modify the one or more visual elements of the digital image based on the one or more mismatches; and generating a modified digital image by providing the prompt to a generative neural network.

6. The computer-implemented method of claim 1, further comprising generating the set of image-text pairs comprising mismatched elements by:

determining the aspect graphs for a plurality of text strings in a plurality of ground-truth image-text pairs comprising the plurality of text strings and corresponding digital images, the aspect graphs comprising nodes representing words or phrases in the plurality of text strings connected according to parts-of-speech characteristics of the words or phrases; and generating modified text strings by replacing a set of nodes in the aspect graphs with replacement nodes representing counterfactual descriptions of one or more words or phrases in relation to the corresponding digital images of the plurality of ground-truth image-text pairs.

7. The computer-implemented method of claim 6, further comprising generating the set of image-text pairs by:

generating a plurality of scores based on plausibility of the modified text strings, grammar composition of the modified text strings, and similarities between the modified text strings and the corresponding digital images; and excluding a subset of image-text pairs from the set of image-text pairs in response to determining that the subset of image-text pairs with one or more of the plurality of scores below one or more threshold scores.

8. The computer-implemented method of claim 6, further comprising modifying the parameters of the image-text matching model by:

generating, utilizing the image-text matching model, predicted mismatches and corrections for image-text pairs in the set of image-text pairs; and modifying the parameters of the image-text matching model to reduce a difference between the predicted mismatches and the corrections and ground-truth mismatches and the corrections according to the plurality of ground-truth image-text pairs.

9. The computer-implemented method of claim 1, further comprising:

determine a plurality of image-text pairs comprising the image-text pair based on an image search utilizing the text string;

determining match scores between the text string and digital images of the plurality of image-text pairs based on mismatches detected in the plurality of image-text pairs utilizing the image-text matching model; and clustering the digital images in a set of search results for the image search based on the match scores.

10. The computer-implemented method of claim 9, wherein clustering the plurality of image-text pairs comprises:

determining attributes of the digital images corresponding to the mismatches detected in the plurality of image-text pairs; and clustering the digital images further based on the attributes of the digital images according to one or more aspects corresponding to the mismatches.

11. A system comprising:

one or more memory devices comprising an image-text matching model comprising parameters trained on a dataset of training image-text pairs comprising mismatched elements, the training image-text pairs generated by modifying aspect graphs of text strings of a set of image-text pairs; and one or more processors configured to cause the system to:

determine an image-text pair comprising a text string including a plurality of text elements and a digital image generated by a generative neural network from the text string;

detect, utilizing the image-text matching model, one or more mismatches between the plurality of text elements of the text string and the digital image; and generate, utilizing the image-text matching model and in response to detecting the one or more mismatches, computing instructions to modify the digital image by replacing one or more elements corresponding to the one or more mismatches with one or more replacement elements.

12. The system of claim 11, wherein the one or more processors are configured to cause the system to:

determine, utilizing the image-text matching model, one or more aspect classes of one or more words or phrases corresponding to the one or more mismatches based on parts-of-speech characteristics of the one or more words or phrases; and generate a triplet for the image-text pair comprising the one or more mismatches, the one or more aspect classes, and one or more corrections to the one or more mismatches.

13. The system of claim 11, wherein the one or more processors are configured to cause the system to detect the one or more mismatches by determining that one or more phrases in the text string do not match one or more visual elements in the digital image based on characteristics of the one or more visual elements in the digital image.

14. The system of claim 11, wherein the one or more processors are configured to cause the system to generate the computing instructions by:

determining the one or more replacement elements corresponding to one or more aspect classes of the one or more elements based on the one or more mismatches; and generating a prompt to provide to the generative neural network to modify one or more visual elements of the digital image according to the one or more replacement elements.

15. The system of claim 14, wherein the one or more processors are configured to cause the system to generate the dataset of training image-text pairs by:

generating a prompt to modify the one or more visual elements of the digital image based on the one or more mismatches; and generating a modified digital image by providing the prompt to a generative neural network.

16. The system of claim 11, wherein the one or more processors are configured to generate the dataset by:

determining an aspect graph for a ground-truth text string corresponding to a corresponding digital image in a ground-truth image-text pair, the aspect graph comprising nodes representing words or phrases in the text string connected according to parts-of-speech characteristics of the words or phrases;

generating a modified text string by replacing a node in the aspect graph with a replacement node representing a counterfactual description of a word or a phrase in relation to the corresponding digital image; and generating a training image-text pair comprising the modified text string and the corresponding digital image.

17. The system of claim 16, wherein the one or more processors are configured to modify the parameters of the image-text matching model by:

generating, utilizing the image-text matching model, one or more predicted mismatches and corrections for the training image-text pair; and modifying the parameters of the image-text matching model to reduce a difference between the one or more predicted mismatches and corrections and ground-truth mismatches and corrections according to the ground-truth image-text pair.

18. A non-transitory computer readable medium storing instructions thereon that, when executed by at least one processor, cause the at least one processor to perform operations comprising:

determining an image-text pair comprising a text string including a plurality of text elements and a digital image corresponding to a query comprising the text string;

detecting one or more mismatches between the plurality of text elements of the text string and the digital image by utilizing an image-text matching model comprising parameters trained on a dataset of training image-text pairs comprising mismatched elements, the training image-text pairs generated by modifying aspect graphs of text strings of a set of image-text pairs; and generating, utilizing the image-text matching model and in response to detecting the one or more mismatches, a modified text string by replacing one or more text elements of the text string corresponding to the one or more mismatches with one or more replacement elements correcting the one or more mismatches.

19. The non-transitory computer readable medium of claim 18, wherein generating the modified text string comprises:

determining, utilizing the image-text matching model, that the image-text pair comprises a mismatch between a phrase of the text string and a visual element of the digital image;

determining, utilizing the image-text matching model, a replacement phrase based on an aspect class of the phrase; and generating, for display via a graphical user interface, a recommendation to generate the modified text string by replacing the phrase with the replacement phrase.

20. The non-transitory computer readable medium of claim 18, wherein the operations further comprise modifying the parameters of the image-text matching model by:

generating a training image-text pair by replacing one or more nodes of an aspect graph of a text string in a ground-truth image-text pair with one or more replacement nodes;

generating a predicted mismatch and correction for the training image-text pair;

determining a loss based on a difference between the predicted mismatch and correction and a ground-truth mismatch and correction according to the training image-text pair; and modifying the parameters of the image-text matching model to reduce the loss.

* * * * *